US012149001B2

(12) United States Patent
Rofougaran et al.

(10) Patent No.: US 12,149,001 B2

(45) Date of Patent: Nov. 19, 2024

(54) WIRELESS TRANSCEIVER HAVING RECEIVE ANTENNAS AND TRANSMIT ANTENNAS WITH ORTHOGONAL POLARIZATIONS IN A PHASED ARRAY ANTENNA PANEL

(71) Applicant: Movandi Corporation, Irvine, CA (US)

(72) Inventors: Ahmadreza Rofougaran, Newport Beach, CA (US); Farid Shirinfar, Granada Hills, CA (US); Sam Gharavi, Irvine, CA (US); Michael Boers, South Turramurra (AU); Seunghwan Yoon, Irvine, CA (US); Alfred Grau Besoli, Irvine, CA (US); Maryam Rofougaran, Rancho Palos Verdes, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

(21) Appl. No.: 17/903,130

(22) Filed: Sep. 6, 2022

(65) Prior Publication Data

US 2022/0416446 A1 Dec. 29, 2022

Related U.S. Application Data

(60) Continuation of application No. 16/935,515, filed on Jul. 22, 2020, now Pat. No. 11,502,425, which is a (Continued)

(51) Int. Cl.

*H01Q 21/24* (2006.01)
*H01Q 1/52* (2006.01)
(Continued)

(52) U.S. Cl.

CPC ............ *H01Q 21/24* (2013.01); *H01Q 1/523* (2013.01); *H01Q 1/525* (2013.01); *H01Q 3/26* (2013.01);
(Continued)

(58) Field of Classification Search

CPC .......... H01Q 1/52; H01Q 1/523; H01Q 1/525; H01Q 3/26; H01Q 5/40; H01Q 5/45;
(Continued)

(56) References Cited

U.S. PATENT DOCUMENTS

| | | |
|---|---|---|
| 5,677,796 A | 10/1997 | Zimmerman et al. |
| 5,724,337 A | 3/1998 | Kawano et al. |

(Continued)

OTHER PUBLICATIONS

Corrected Notice of Allowance for U.S. Appl. No. 16/927,225 dated Nov. 23, 2022.

(Continued)

*Primary Examiner* — Robert Karacsony

(74) *Attorney, Agent, or Firm* — CHIP LAW GROUP

(57) ABSTRACT

A wireless communication device includes reconfigurable receive transmit antennas having horizontal-polarization antennas and vertical-polarization antennas, where the horizontal-polarization antennas receive or transmit horizontally-polarized signal for a first period of time, where the vertical-polarization antennas transmit or receive vertically-polarized signal for a second period of time, where the horizontal-polarization receive antennas form a receive beam based on receive phase and receive amplitude information provided by a master chip, and where the vertical-polarization transmit antennas form a transmit beam based on transmit phase and transmit amplitude information provided by the master chip.

18 Claims, 10 Drawing Sheets

Related U.S. Application Data division of application No. 15/256,222, filed on Sep. 2, 2016, now Pat. No. 10,854,995.

(51) Int. Cl.
*H01Q 3/26* (2006.01)
*H01Q 3/38* (2006.01)
*H01Q 3/40* (2006.01)
*H01Q 23/00* (2006.01)
*H01Q 25/00* (2006.01)

(52) U.S. Cl.
CPC ................ *H01Q 3/38* (2013.01); *H01Q 3/40* (2013.01); *H01Q 23/00* (2013.01); *H01Q 25/001* (2013.01)

(58) Field of Classification Search
CPC .......... H01Q 21/0025; H01Q 21/0006; H01Q 21/06; H01Q 21/061; H01Q 21/062; H01Q 21/064; H01Q 21/065; H01Q 21/067; H01Q 21/24; H01Q 21/245; H01Q 23/00; H01Q 25/001
See application file for complete search history.

(56) References Cited

U.S. PATENT DOCUMENTS 7,079,079 B2 7/2006 Jo et al.
7,363,058 B2 4/2008 Gustaf
7,675,465 B2 3/2010 Doan et al.
7,679,576 B2 3/2010 Riedel et al.
9,130,262 B2 9/2015 Park et al.
9,178,546 B1 11/2015 Klemes
9,252,908 B1 2/2016 Branlund
10,080,274 B2 9/2018 Johnson
10,199,717 B2 2/2019 Rofougaran et al.
10,389,041 B2 8/2019 Yoon et al.
10,854,995 B2 12/2020 Rofougaran et al.
10,965,411 B2 3/2021 Moshfeghi
11,018,816 B2 5/2021 Moshfeghi
11,056,764 B2 7/2021 Rofougaran et al.
11,075,724 B2 7/2021 Moshfeghi
11,088,756 B2 8/2021 Gharavi et al.
11,128,415 B2 9/2021 Moshfeghi
11,342,968 B2 5/2022 Yoon et al.
11,394,128 B2 7/2022 Rofougaran et al.
11,637,664 B2 4/2023 Moshfeghi
11,652,584 B2 5/2023 Moshfeghi
11,715,890 B2 8/2023 Rofougaran et al.
2004/0204114 A1 10/2004 Brennan et al.
2005/0134517 A1 6/2005 Gottl
2006/0040615 A1 2/2006 Mohamadi
2006/0063487 A1 3/2006 Cleveland et al.
2006/0170595 A1 8/2006 Gustaf
2007/0001924 A1 1/2007 Hirabayashi
2008/0207259 A1 8/2008 Rofougaran
2009/0046624 A1 2/2009 Martinez et al.
2009/0066590 A1 3/2009 Yamada et al.
2009/0156227 A1 6/2009 Frerking et al.
2009/0197538 A1 8/2009 Borran et al.
2010/0097976 A1 4/2010 Agrawal et al.
2010/0159859 A1 6/2010 Rofougaran
2010/0284446 A1 11/2010 Mu et al.
2011/0039496 A1 2/2011 Chueh et al.
2011/0109507 A1* 5/2011 Warnick ............ H01Q 21/0025 342/368
2011/0159801 A1 6/2011 Maltsev et al.
2011/0190005 A1 8/2011 Cheon et al.
2011/0256877 A1 10/2011 Hoymann et al.
2012/0026998 A1 2/2012 O'Keeffe et al.
2012/0149300 A1 6/2012 Forster
2012/0320874 A1 12/2012 Li et al.
2013/0034128 A1 2/2013 Gore et al.
2013/0122802 A1 5/2013 Wang et al.
2013/0341128 A1 12/2013 Jordan et al.
2014/0104124 A1 4/2014 Chernokalov et al.
2014/0210668 A1 7/2014 Wang et al.
2015/0340765 A1 11/2015 Dang et al.
2016/0049723 A1 2/2016 Baks et al.
2016/0204513 A1 7/2016 Yemelong et al.
2016/0359230 A1 12/2016 Wang et al.
2017/0324171 A1 11/2017 Shehan
2017/0353338 A1* 12/2017 Amadjikpe .......... H01Q 21/065
2018/0063139 A1 3/2018 Day et al.
2018/0191053 A1 7/2018 Ndip et al.
2018/0191062 A1 7/2018 Ndip et al.
2018/0231651 A1 8/2018 Charvat
2018/0269576 A1 10/2018 Scarborough et al.
2018/0316090 A1 11/2018 Foo
2019/0020399 A1 1/2019 Coutts
2019/0020402 A1 1/2019 Gharavi et al.
2019/0020407 A1 1/2019 Gharavi et al.
2019/0230626 A1 7/2019 Rune et al.
2019/0334253 A1* 10/2019 Corman ................... H04B 7/10
2020/0185299 A1 6/2020 Chang et al.
2021/0058140 A1 2/2021 Schwab et al.
2021/0203085 A1 7/2021 Jordan et al.
2022/0158717 A1 5/2022 Frenger et al.

OTHER PUBLICATIONS

Corrected Notice of Allowance for U.S. Appl. No. 16/935,422 dated Oct. 17, 2022.
Corrected Notice of Allowance for U.S. Appl. No. 16/935,422 dated Sep. 14, 2022.
Corrected Notice of Allowance for U.S. Appl. No. 16/935,515 dated Oct. 17, 2022.
Corrected Notice of Allowance for U.S. Appl. No. 16/935,515 dated Sep. 14, 2022.
Corrected Notice of Allowance for U.S. Appl. No. 17/329,276 dated Nov. 23, 2022.
Corrected Notice of Allowance for U.S. Appl. No. 17/329,276 dated Oct. 11, 2022.
Corrected Notice of Allowance for U.S. Appl. No. 17/337,529 dated Nov. 10, 2022.
Corrected Notice of Allowance for U.S. Appl. No. 17/337,529 dated Oct. 5, 2022.
Corrected Notice of Allowance for U.S. Appl. No. 17/365,037 dated Nov. 15, 2022.
Corrected Notice of Allowance for U.S. Appl. No. 17/365,037 dated Nov. 25, 2022.
Corrected Notice of Allowance for U.S. Appl. No. 17/208,984 dated Nov. 23, 2022.
Final Office Action for U.S. Appl. No. 17/011,042 dated Oct. 7, 2022.
Non-Final Office Action for U.S. Appl. No. 17/887,672 dated Dec. 6, 2022.
Non-Final Office Action for U.S. Appl. No. 17/209,030 dated Oct. 14, 2022.
Non-Final Office Action for U.S. Appl. No. 17/230,696 dated Oct. 6, 2022.
Non-Final Office Action for U.S. Appl. No. 17/377,983 dated Oct. 26, 2022.
Non-Final Office Action for U.S. Appl. No. 17/382,398 dated Oct. 19, 2022.
Non-Final Office Action for U.S. Appl. No. 17/408,583 dated Nov. 4, 2022.
Non-Final Office Action for U.S. Appl. No. 17/536,235 dated Oct. 11, 2022.
Non-Final Office Action for U.S. Appl. No. 17/742,648 dated Oct. 5, 2022.
Notice of Allowability for U.S. Appl. No. 17/004,373 dated Oct. 24, 2022.
Notice of Allowability for U.S. Appl. No. 17/060,182 dated Oct. 20, 2022.
Notice of Allowability for U.S. Appl. No. 17/060,182 dated Sep. 20, 2022.
Notice of Allowability for U.S. Appl. No. 17/243,747 dated Dec. 2, 2022.

(56) References Cited

OTHER PUBLICATIONS

Notice of Allowance for U.S. Appl. No. 16/927,225 dated Oct. 3, 2022.
Notice of Allowance for U.S. Appl. No. 17/243,747 dated Sep. 27, 2022.
Notice of Allowance for U.S. Appl. No. 17/863,874 dated Nov. 18, 2022.
Supplemental Notice of Allowability for U.S. Appl. No. 17/208,984 dated Nov. 10, 2022.
Final Office Action for U.S. Appl. No. 17/011,042 dated May 12, 2023.
Final Office Action for U.S. Appl. No. 17/903,092 dated Jun. 8, 2023.
Non-Final Office Action for U.S. Appl. No. 17/887,672 dated Jul. 10, 2023.
Non-Final Office Action for U.S. Appl. No. 17/988,827 dated Jun. 22, 2023.
Non-Final Office Action for U.S. Appl. No. 18/083,756 dated Jun. 21, 2023.
Non-Final Office Action for U.S. Appl. No. 18/175,408 dated Jun. 16, 2023.
Notice of Allowance for U.S. Appl. No. 17/377,983 dated Apr. 19, 2023.
Notice of Allowance for U.S. Appl. No. 17/396,063 dated May 26, 2023.
Corrected Notice of Allowability for U.S. Appl. No. 17/382,398 dated Mar. 13, 2023.
Corrected Notice of Allowance for U.S. Appl. No. 17/742,648 dated Feb. 1, 2023.
Final Office Action for U.S. Appl. No. 17/377,983 dated Feb. 10, 2023.
Final Office Action for U.S. Appl. No. 17/887,672 dated Mar. 30, 2023.
Non-Final Office Action for U.S. Appl. No. 17/011,042 dated Feb. 3, 2023.
Non-Final Office Action for U.S. Appl. No. 17/396,063 dated Jan. 18, 2023.
Non-Final Office Action for U.S. Appl. No. 17/898,706 dated Mar. 28, 2023.
Non-Final Office Action for U.S. Appl. No. 17/903,092 dated Feb. 16, 2023.
Notice of Allowance for U.S. Appl. No. 17/208,893 dated Mar. 8, 2023.
Notice of Allowance for U.S. Appl. No. 17/209,030 dated Feb. 8, 2023.
Notice of Allowance for U.S. Appl. No. 17/230,696 dated Jan. 20, 2023.
Notice of Allowance for U.S. Appl. No. 17/382,398 dated Feb. 28, 2023.
Notice of Allowance for U.S. Appl. No. 17/408,583 dated Feb. 27, 2023.
Notice of Allowance for U.S. Appl. No. 17/408,606 dated Feb. 1, 2023.
Notice of Allowance for U.S. Appl. No. 17/536,235 dated Feb. 15, 2023.
Notice of Allowance for U.S. Appl. No. 17/742,648 dated Jan. 25, 2023.
Notice of Allowance for U.S. Appl. No. 17/946,734 dated Jan. 30, 2023.
Notice of Allowance for U.S. Appl. No. 17/978,565 dated Mar. 17, 2023.
Non-Final Office Action for U.S. Appl. No. 17/011,042 dated Sep. 15, 2023.
Non-Final Office Action for U.S. Appl. No. 17/903,092 dated Sep. 14, 2023.
Non-Final Office Action for U.S. Appl. No. 17/943,300 dated Sep. 27, 2023.
Notice of Allowance for U.S. Appl. No. 17/887,672 dated Oct. 17, 2023.
Notice of Allowance for U.S. Appl. No. 17/898,706 dated Aug. 8, 2023.
Final Office Action for U.S. Appl. No. 17/011,042 dated Jan. 5, 2024.
Non-Final Office Action for U.S. Appl. No. 18/323,002 dated Feb. 1, 2024.
Non-Final Office Action for U.S. Appl. No. 18/175,408 dated Jan. 5, 2024.
Non-Final Office Action for U.S. Appl. No. 18/321,114 dated Feb. 1, 2024.
Notice of Allowance for U.S. Appl. No. 17/943,300 dated Jan. 18, 2024.
Notice of Allowance for U.S. Appl. No. 18/083,756 dated Nov. 14, 2023.
Final Office Action for U.S. Appl. No. 17/903,092 dated Mar. 29, 2024.
Final Office Action for U.S. Appl. No. 18/175,408 dated Jun. 10, 2024.
Final Office Action for U.S. Appl. No. 18/321,160 dated May 30, 2024.
Non-Final Office Action for U.S. Appl. No. 17/011,042 dated Apr. 29, 2024.
Non-Final Office Action for U.S. Appl. No. 18/321,114 dated May 17, 2024.
Non-Final Office Action for U.S. Appl. No. 18/321,160 dated Feb. 15, 2024.
Non-Final Office Action for U.S. Appl. No. 18/326,222 dated Apr. 19, 2024.
Notice of Allowance for U.S. Appl. No. 17/988,827 dated Feb. 22, 2024.
Notice of Allowance for U.S. Appl. No. 18/323,002 dated May 15, 2024.
Final Office Action for U.S. Appl. No. 17/011,042 dated Aug. 16, 2024.
Non-Final Office Action for U.S. Appl. No. 17/903,092 dated Jul. 5, 2024.
Notice of Allowance for U.S. Appl. No. 18/326,222 dated Jul. 29, 2024.

* cited by examiner

301

WIRELESS TRANSCEIVER HAVING RECEIVE ANTENNAS AND TRANSMIT ANTENNAS WITH ORTHOGONAL POLARIZATIONS IN A PHASED ARRAY ANTENNA PANEL

CROSS REFERENCE TO RELATED APPLICATION(S)

This Patent Application makes reference to, claims priority to, claims the benefit of, and is a Continuation Application of U.S. patent application Ser. No. 16/935,515, filed on Jul. 22, 2020, which is a Divisional Application of U.S. Pat. No. 10,854,995, filed on Sep. 2, 2016. The present application is related to U.S. Pat. No. 9,923,712, filed on Aug. 1, 2016, and titled "Wireless Receiver with Axial Ratio and Cross-Polarization Calibration," and U.S. Pat. No. 10,323,943, filed on Aug. 1, 2016, and titled "Wireless Receiver with Tracking Using Location, Heading, and Motion Sensors and Adaptive Power Detection," and U.S. Pat. No. 10,290,920, filed on Aug. 2, 2016, and titled "Large Scale Integration and Control of Antennas with Master Chip and Front End Chips on a Single Antenna Panel," and U.S. Pat. No. 10,014,567, filed on Sep. 2, 2016, and titled "Novel Antenna Arrangements and Routing Configurations in Large Scale Integration of Antennas with Front End Chips in a Wireless Receiver," and U.S. Pat. No. 9,692,489, filed on Sep. 2, 2016, and titled "Transceiver Using Novel Phased Array Antenna Panel for Concurrently Transmitting and Receiving Wireless Signals." The above-referenced applications are hereby incorporated herein by reference in its entirety.

BACKGROUND

Wireless communications systems, such as satellite communications systems, can transmit data using orthogonally-polarized-channels occupying the same RF frequency band to increase the available spectrum. However, interference between the orthogonally-polarized-channels is inevitable, and can lead to crosstalk among the channels and symbols comprising data streams, thereby causing an increase in bit error rate (BER) on the receiving end of the wireless communications system. Furthermore, in conventional wireless transceivers that can establish two-way communications to and from satellites, transmit antennas and receive antennas can be arranged on separate antenna panels. In this conventional approach, the transmit panel and the receive panel can be oriented and adjusted separately so that both panels can align precisely with, for example, a target satellite. However, in this conventional approach, wireless transceivers would have a large size due to two separate antenna panels, and would also require a large number of processing elements and complex routing networks to coordinate the transmission and reception operations, which can lead to undesirable signal delays, and high implementation cost and complexity.

Accordingly, there is a need in the art for a compact wireless transceiver that can effectively increase signal isolation and reduce bit error rate.

SUMMARY

The present disclosure is directed to a wireless transceiver having receive antennas and transmit antennas with orthogonal polarizations in a phased array antenna panel, substantially as shown in and/or described in connection with at least one of the figures, and as set forth in the claims.

DETAILED DESCRIPTION

Figure 1A:
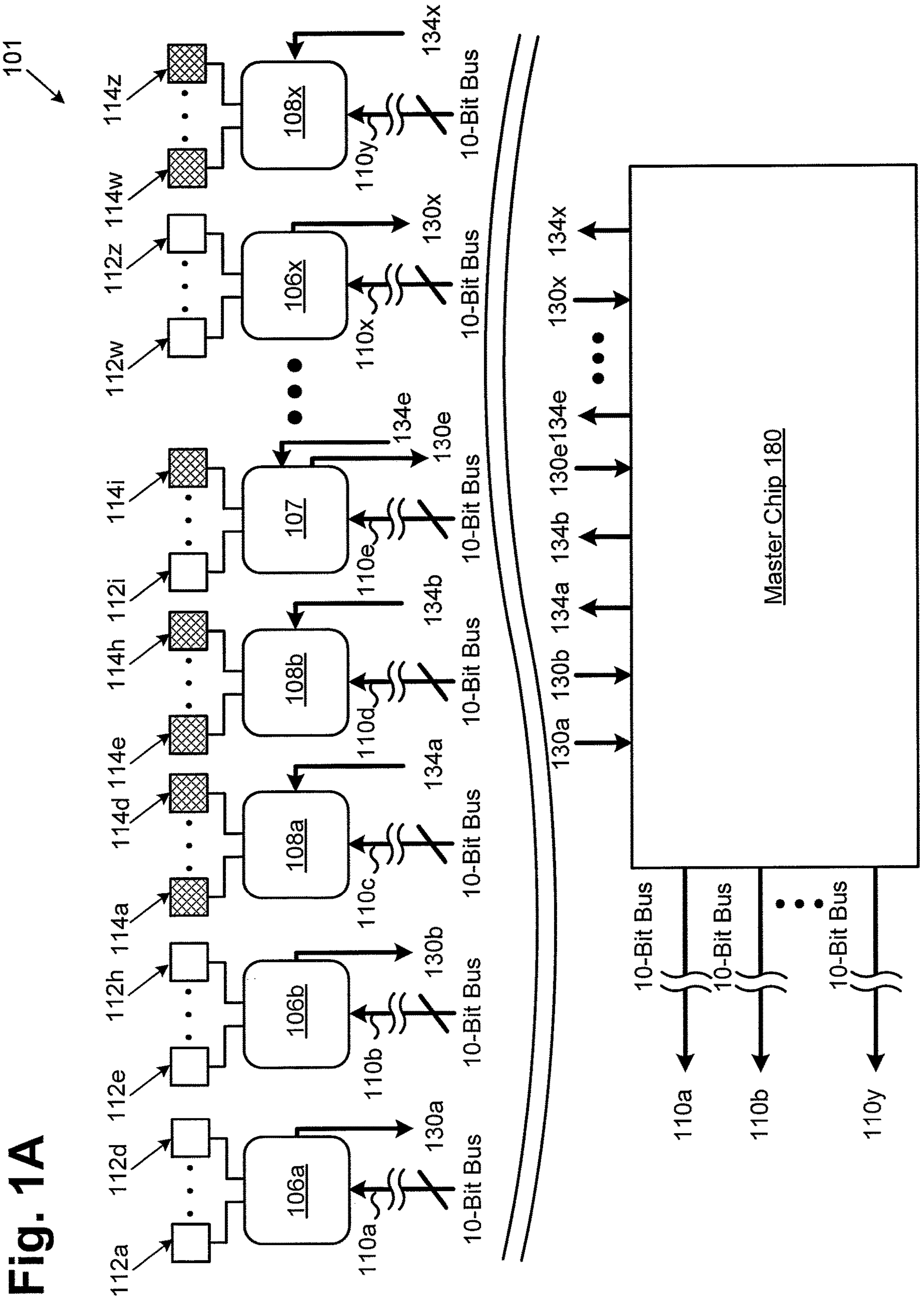
FIG. 1A illustrates a functional block diagram of a portion of an exemplary wireless transceiver according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Referring to FIG. 1A, FIG. 1A illustrates a functional block diagram of a portion of an exemplary wireless transceiver according to one implementation of the present application. As illustrated in FIG. 1A, wireless transceiver 101 includes radio frequency (RF) front end chips 106*a*, 106*b* and 106*x* (collectively referred to as RF front end chips 106*a* through 106*x*), RF front end chip 107, RF front end chips 108*a*, 108*b*, and 108*x* (collectively referred to as RF front end chips 108*a* through 108*x*), receive antennas 112*a*, 112*d*, 112*e*, 112*h*, 112*i*, 112*w* and 112*z* (collectively referred to as receive antennas 112*a* through 112*z*), transmit antennas 114*a*, 114*d*, 114*e*, 114*h*, 114*i*, 114*w* and 114*z* (collectively referred to as transmit antennas 114*a* through 114*z*), and master chip 180. In the present implementation, wireless transceiver 101 includes receive antennas 112*a* through 112*z* and transmit antennas 114*a* through 114*z* in a single phased array antenna panel for transmitting and receiving wireless signals.

As can be seen in FIG. 1A, RF front end chip 106*a* is connected to a group of receive antennas, such as receive antennas 112*a* and 112*d*. RF front end chip 106*b* is connected to a group of receive antennas, such as receive antennas 112*e* and 112*h*. RF front end chip 108*a* is connected to a group of transmit antennas, such as transmit antennas 114*a* and 114*d*. RF front end chip 108*b* is connected to a group of transmit antennas, such as transmit antennas 114*e* and 114*h*. RF front end chip 107 is connected to one or more receive antennas, such as receive antenna 112*i*, and one or more transmit antennas, such as transmit antenna 114*i*. RF front end chip 106*x* is connected to a group of receive antennas, such as receive antennas 112*w* and 112*z*. RF front end chip 108*x* is connected to a group of transmit antennas, such as transmit antennas 114*w* and 114*z*. It should be noted that total numbers of receive antennas and transmit antennas may vary to suit the specific needs of a particular application.

Figure 4:
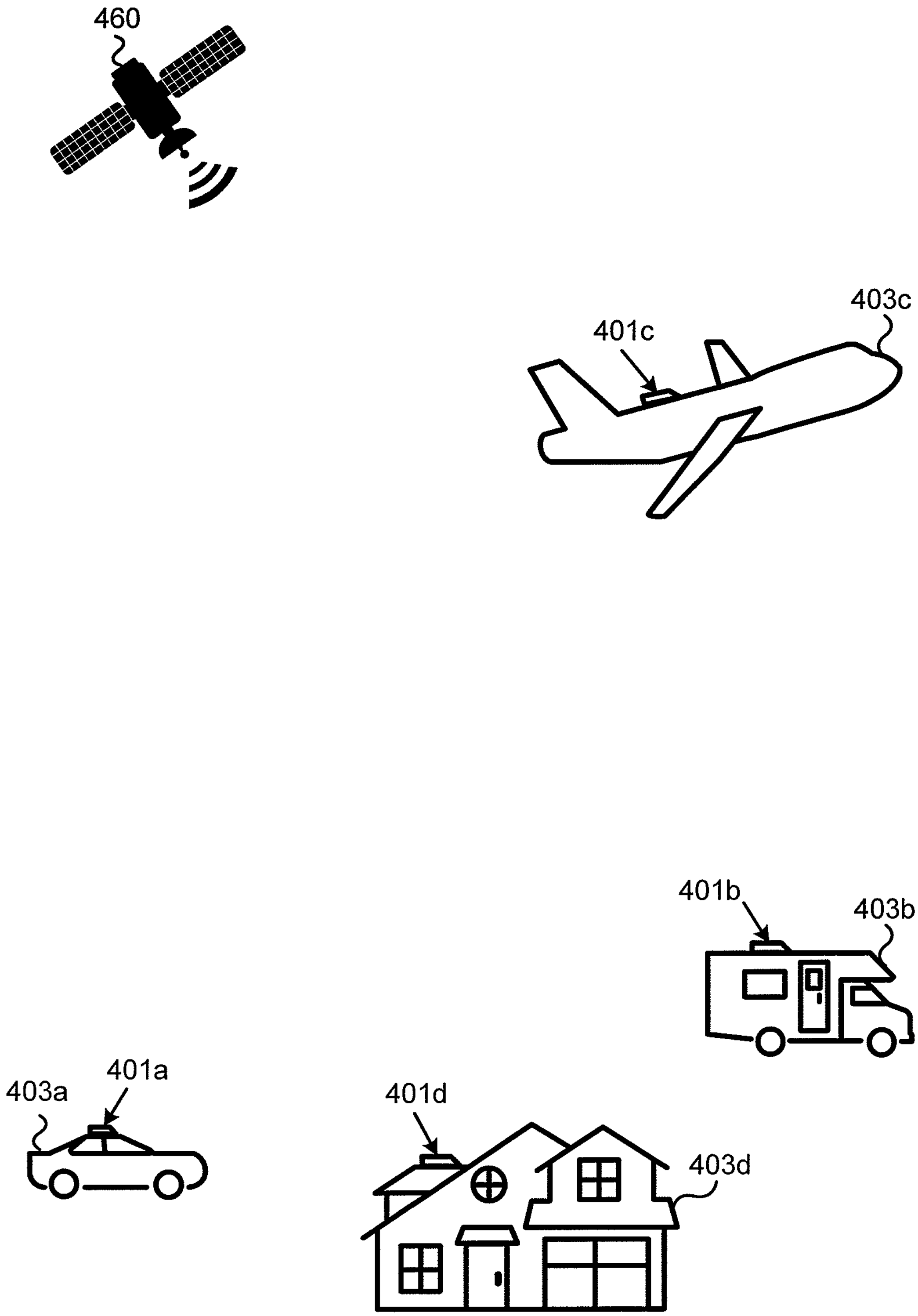
FIG. 4 is an exemplary wireless communications system utilizing exemplary wireless transceivers according to one implementation of the present application.

In the present implementation, wireless transceiver 101 may pair with another wireless transceiver, such as satellite 460 or wireless transceiver 401*a*/401*b*/401*c*/401*d* in FIG. 4, through a handshake procedure to establish conventions for transmission and reception polarizations. Once the pair of wireless transceivers coordinate and establish their transmission and reception polarizations, they can transmit and receive wireless communications signals using the established transmission and reception polarizations.

The present implementation utilizes receive antennas 112*a* through 112*z* of a first polarization for reception, and transmit antennas 114*a* through 114*z* of a second polarization for transmission. Because the first and second polarizations (e.g., horizontal and vertical polarizations, or right-hand circular-polarization and left-hand circular-polarizations) are orthogonal to each other, the transmit signals transmitted by transmit antennas 114*a* through 114*z* and receive signals received by receive antennas 112*a* through 112*z* are well isolated from each other, thereby substantially eliminating crosstalk between the transmit and receive signals. In addition, in contrast to conventional communications systems where orthogonally-polarized-channels occupying the same RF frequency band are utilized for transmission/reception, because implementations of the present application utilize only one polarization for transmission and only an orthogonal polarization for reception, interference among transmit and/or receive signals can also be effectively eliminated, thereby substantially reducing the bit error rate of the wireless transceiver.

In the present implementation, each of receive antennas 112*a* through 112*z* is a linear-polarization receive antenna of a first polarization, while each of transmit antennas 114*a* through 114*z* is a linear-polarization transmit antenna of a second polarization that is orthogonal to the first polarization. For example, in one implementation, receive antennas 112*a* through 112*z* are horizontal-polarization receive antennas for receiving horizontally-polarized signals, while transmit antennas 114*a* through 114*z* are vertical-polarization transmit antennas for transmitting vertically-polarized signals. In this implementation, receive antennas 112*a* and 112*d* may each provide a horizontally-polarized signal to RF front end chip 106*a*, which combines the horizontally-polarized signals, by adding powers and combining phases of the individual horizontally-polarized signals from receive antennas 112*a* and 112*d*, and provides combined signal 130*a* (i.e., a horizontally-polarized combined signal) to master chip 180. Similarly, receive antennas 112*e* and 112*h* may each provide a horizontally-polarized signal to RF front end chip 106*b*, which combines the horizontally-polarized signals, by adding powers and combining phases of the individual horizontally-polarized signals from receive antennas 112*e* and 112*h*, and provides combined signal 130*b* (i.e., a horizontally-polarized combined signal) to master chip 180. Receive antennas 112*i* and other receive antennas may each provide a horizontally-polarized signal to RF front end chip 107, which combines the horizontally-polarized signals, by adding powers and combining phases of the individual horizontally-polarized signals from receive antennas 112*i* a and other receive antennas connected thereto, and provides combined signal 130*e* (i.e., a horizontally-polarized combined signal) to master chip 180. Also, receive antennas 112*w* and 112*z* may each provide a horizontally-polarized signal to RF front end chip 106*x*, which combines the horizontally-polarized signals, by adding powers and combining phases of the individual horizontally-polarized signals from receive antennas 112*w* and 112*z*, and provides combined signal 130*x* (i.e., a horizontally-polarized combined signal) to master chip 180.

In this implementation, since receive antennas 112*a* through 112*z* are horizontal-polarization antennas, transmit antennas 114*a* through 114*z* are vertical-polarization antennas. RF front end chip 108*a* may receive a vertically-polarized combined signal 134*a* from master chip 180, and provide vertically-polarized signals to transmit antennas 114*a* and 114*d* for transmission. RF front end chip 108*b* may receive a vertically-polarized combined signal 134*b* from master chip 180, and provide vertically-polarized signals to transmit antennas 114*e* and 114*h* for transmission. RF front end chip 107 may receive a vertically-polarized combined signal 134*e* from master chip 180, and provide vertically-polarized signals to transmit antenna 114*i* and other transmit antennas connected thereto for transmission. RF front end chip 108*x* may receive a vertically-polarized combined signal 134*x* from master chip 180, and provide vertically-polarized signals to transmit antennas 114*w* and 114*z* for transmission.

In another implementation, receive antennas 112*a* through 112*z* are vertical-polarization receive antennas for receiving vertically-polarized signals, while transmit antennas 114*a* through 114*z* are horizontal-polarization transmit antennas for transmitting horizontally-polarized signals. In this implementation, receive antennas 112*a* and 112*d* may each provide a vertically-polarized signal to RF front end chip 106*a*, which combines the vertically-polarized signals, by adding powers and combining phases of the individual vertically-polarized signals from receive antennas 112*a* and 112*d*, and provides combined signal 130*a* (i.e., a vertically-polarized combined signal) to master chip 180. Similarly, receive antennas 112*e* and 112*h* may each provide a vertically-polarized signal to RF front end chip 106*b*, which combines the vertically-polarized signals, by adding powers and combining phases of the individual vertically-polarized signals from receive antennas 112*e* and 112*h*, and provides combined signal 130*b* (i.e., a vertically-polarized combined signal) to master chip 180. Receive antennas 112*i* and other receive antennas may each provide a vertically-polarized signal to RF front end chip 107, which combines the vertically-polarized signals, by adding powers and combining phases of the individual vertically-polarized signals from receive antennas 112*i* and other receive antennas connected thereto, and provides combined signal 130*e* (i.e., a vertically-polarized combined signal) to master chip 180. Also, receive antennas 112*w* and 112*z* may each provide a vertically-polarized signal to RF front end chip 106*x*, which combines the vertically-polarized signals, by adding powers and combining phases of the individual vertically-polarized signals from receive antennas 112*w* and 112*z*, and provides combined signal 130*x* (i.e., a vertically-polarized combined signal) to master chip 180.

In this implementation, since receive antennas 112*a* through 112*z* are vertical-polarization antennas, transmit antennas 114*a* through 114*z* are horizontal-polarization antennas. RF front end chip 108*a* may receive a horizontally-polarized combined signal 134*a* from master chip 180, and provide horizontally-polarized signals to transmit antennas 114*a* and 114*d* for transmission. RF front end chip 108*b* may receive a horizontally-polarized combined signal 134*b* from master chip 180, and provide horizontally-polarized signals to transmit antennas 114*e* and 114*h* for transmission. RF front end chip 107 may receive a horizontally-polarized combined signal 134*e* from master chip 180, and provide horizontally-polarized signals to transmit antenna 114*i* and other transmit antennas connected thereto for transmission. RF front end chip 108*x* may receive a horizontally-polarized combined signal 134*x* from master chip 180, and provide horizontally-polarized signals to transmit antennas 114*w* and 114*z* for transmission.

In another implementation, receive antennas 112*a* through 112*z* are right-hand circular-polarization receive antennas for receiving right-hand circularly-polarized signals, while transmit antennas 114*a* through 114*z* are left-hand circular-polarization transmit antennas for transmitting left-hand circularly-polarized signals. In yet another implementation, receive antennas 112*a* through 112*z* are left-hand circular-polarization receive antennas for receiving left-hand circularly-polarized signals, while transmit antennas 114*a* through 114*z* are right-hand circular-polarization transmit antennas for transmitting right-hand circularly-polarized signals.

As illustrated in FIG. 1A, master chip 180 receives combined signals 130*a*, 130*b*, 130*e* and 130*x* from RF front end chips 106*a*, 106*b*, 107 and 106*x*, respectively. Master chip 180 provides combined signals 134*a*, 134*b*, 134*e* and 134*x* to RF front end chips 108*a*, 108*b*, 107 and 108*x*, respectively. In addition, master chip 180 also provides control bus 110*a*, 110*b*, 110*c*, 110*d*, 110*e*, 110*x* and 110*y* to RF front end chips 106*a*, 106*b*, 108*a*, 108*b*, 107, 106*x* and 108*x*, respectively.

In the present implementation, receive antennas 112*a* through 112*z* form a receive beam at a receive frequency based on phase and amplitude information provided by master chip 180 to corresponding RF front end chips 106*a*, 106*b*, 107 and 106*x* in a phased array antenna panel, such as phased array antenna panels 202 shown in FIGS. 2A through 2D. Transmit antennas 114*a* through 114*z* form a transmit beam at a transmit frequency based on phase and amplitude information provided by master chip 180 to corresponding RF front end chips 108*a*, 108*b*, 107 and 108*x* in the phased array antenna panel.

In one implementation, master chip 180 is configured to drive in parallel control buses 110*a* through 110*y*. By way of one example, and without limitation, control buses 110*a* through 110*y* are ten-bit control buses in the present implementation. In one implementation, RF front end chips 106*a*, 106*b*, 106*x*, 107, 108*a*, 108*b* and 108*x*, and all the receive and transmit antennas coupled to corresponding RF front end chips 106*a*, 106*b*, 106*x*, 107, 108*a*, 108*b* and 108*x*, and master chip 180 are integrated on a single substrate, such as a printed circuit board.

Figure 1B:
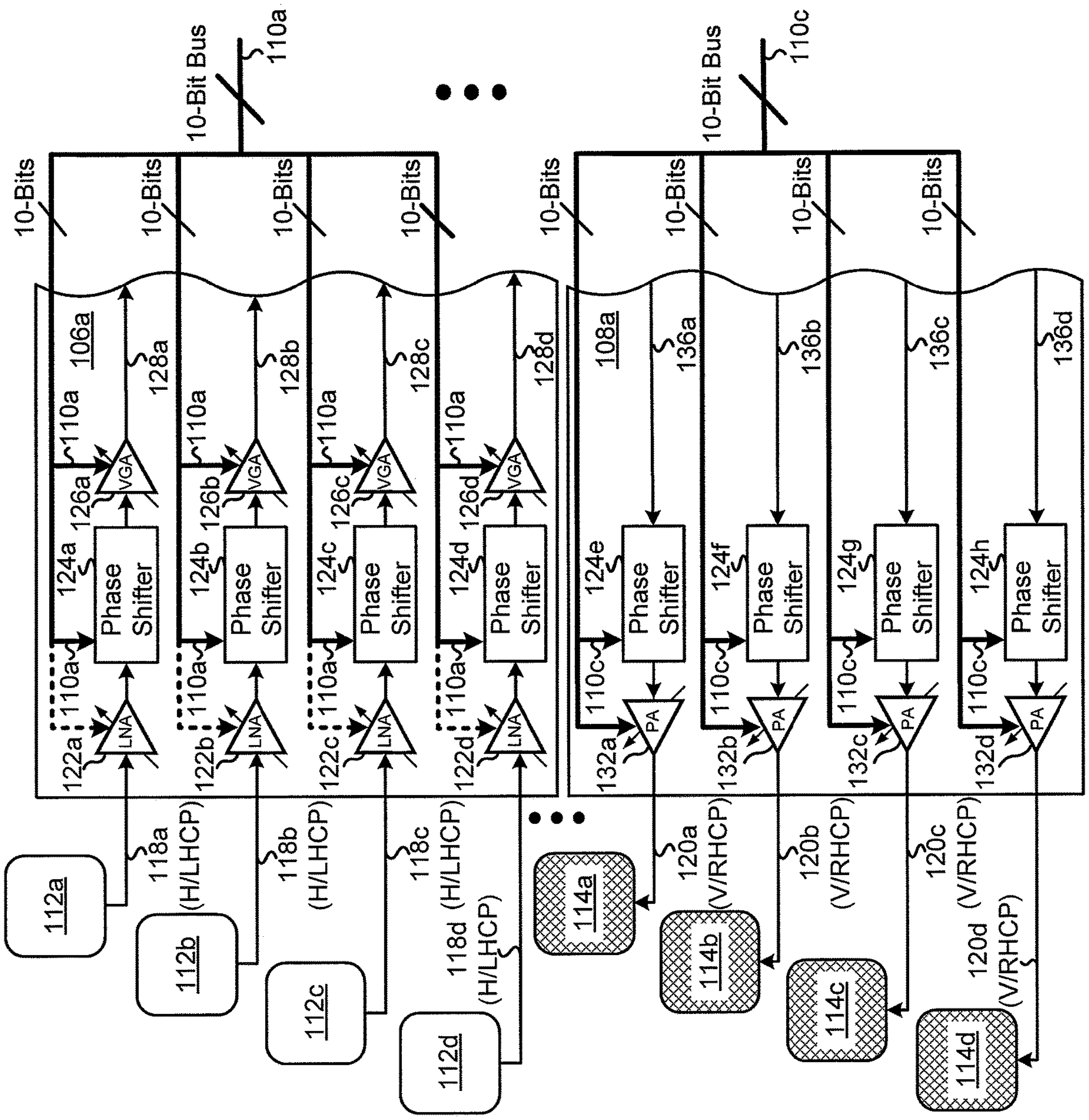
FIG. 1B illustrates a functional block diagram of a portion of an exemplary wireless transceiver according to one implementation of the present application.

Referring now to FIG. 1B, FIG. 1B illustrates a functional block diagram of a portion of an exemplary wireless transceiver according to one implementation of the present application. With similar numerals representing similar features in FIG. 1A, FIG. 1B includes receive antennas 112*a*, 112*b*, 112*c* and 112*d* coupled to RF front end chip 106*a*, and transmit antennas 114*a*, 114*b*, 114*c* and 114*d* coupled to RF front end chip 108*a*.

In the present implementation, receive antennas 112*a*, 112*b*, 112*c* and 112*d* may be configured to receive signals from one or more wireless transceivers, such as commercial geostationary communication satellites or low earth orbit satellites having a very large bandwidth in the 10 GHz to 20 GHz frequency range and a very high data rate. In another implementation, receive antennas 112*a*, 112*b*, 112*c* and 112*d* may be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

As illustrated in FIG. 1B, in one implementation, receive antennas 112*a*, 112*b*, 112*c* and 112*d* are horizontal-polarization receive antennas configured to provide horizontally-polarized signals 118*a*, 118*b*, 118*c* and 118*d*, respectively, to RF front end chip 106*a*. As shown in FIG. 1B, horizontally-polarized signal 118*a* from receive antenna 112*a* is provided to a receive circuit having low noise amplifier (LNA) 122*a*, phase shifter 124*a* and variable gain amplifier (VGA) 126*a*, where LNA 122*a* is configured to generate an output to phase shifter 124*a*, and phase shifter 124*a* is configured to generate an output to VGA 126*a*. Horizontally-polarized signal 118*b* from receive antenna 112*b* is provided to a receive circuit having low noise amplifier (LNA) 122*b*, phase shifter 124*b* and variable gain amplifier (VGA) 126*b*, where LNA 122*b* is configured to generate an output to phase shifter 124*b*, and phase shifter 124*b* is configured to generate an output to VGA 126*b*. Horizontally-polarized signal 118*c* from receive antenna 112*c* is provided to a receive circuit having low noise amplifier (LNA) 122*c*, phase shifter 124*c* and variable gain amplifier (VGA) 126*c*, where LNA 122*c* is configured to generate an output to phase shifter 124*c*, and phase shifter 124*c* is configured to generate an output to VGA 126*c*. Horizontally-polarized signal 118*d* from receive antenna 112*d* is provided to a receive circuit having low noise amplifier (LNA) 122*d*, phase shifter 124*d* and variable gain amplifier (VGA) 126*d*, where LNA 122*d* is configured to generate an output to phase shifter 124*d*, and phase shifter 124*d* is configured to generate an output to VGA 126*d*.

As further illustrated in FIG. 1B, control bus 110*a* is provided to RF front end chip 106*a*, where control bus 110*a* is configured to provide phase shift information/signals to phase shifters 124*a*, 124*b*, 124*c* and 124*d* in RF front end chip 106*a* to cause a phase shift in at least one of horizontally-polarized signals 118*a*, 118*b*, 118*c* and 118*d*. Control bus 110*a* is also configured to provide amplitude control information/signals to VGAs 126*a*, 126*b*, 126*c* and 126*d*, and optionally to LNAs 122*a*, 122*b*, 122*c* and 122*d* in RF front end chip 106*a* to cause an amplitude change in at least one of horizontally-polarized signals 118*a*, 118*b*, 118*c* and 118*d*.

In one implementation, amplified and phase shifted horizontally-polarized signals 128*a*, 128*b*, 128*c* and 128*d* may be provided to a summation block (not explicitly shown in FIG. 1B), that is configured to sum all of the powers of the amplified and phase shifted horizontally-polarized signals to provide a combined signal to a master chip, such as combined signal 130*a* (i.e., a horizontally polarized combined signal) provided to master chip 180 in FIG. 1A.

In the present implementation, transmit antennas 114*a*, 114*b*, 114*c* and 114*d* may be configured to transmit signals to one or more wireless transceivers, such as commercial geostationary communication satellites or low earth orbit satellites having a very large bandwidth in the 10 GHz to 20 GHz frequency range and a very high data rate. In another implementation, transmit antennas 114*a*, 114*b*, 114*c* and 114*d* may be configured to transmit signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

As illustrated in FIG. 1B, in one implementation, as receive antennas 112*a*, 112*b*, 112*c* and 112*d* are horizontal-polarization receive antennas configured to receive horizontally-polarized signals, transmit antennas 114*a*, 114*b*, 114*c* and 114*d* are vertical-polarization transmit antennas configured to transmit vertically-polarized signals based on vertically-polarized signals 120*a*, 120*b*, 120*c* and 120*d*, respectively.

As illustrated in FIG. 1B, vertically-polarized input 136*a*, for example, from master chip 180 in FIG. 1A, is provided to a transmit circuit having phase shifter 124*e* and power amplifier (PA) 132*a*, where phase shifter 124*e* is configured to generate an output to PA 132*a*, and PA 132*a* is configured to generate vertically-polarized signal 120*a* to transmit antenna 114*a* for transmission. Vertically-polarized input 136*b*, for example, from master chip 180 in FIG. 1A, is provided to a transmit circuit having phase shifter 124*f* and power amplifier (PA) 132*b*, where phase shifter 124*f* is configured to generate an output to PA 132*b*, and PA 132*b* is configured to generate vertically-polarized signal 120*b* to transmit antenna 114*b* for transmission. Vertically-polarized input 136*c*, for example, from master chip 180 in FIG. 1A, is provided to a transmit circuit having phase shifter 124*g* and power amplifier (PA) 132*c*, where phase shifter 124*g* is configured to generate an output to PA 132*c*, and PA 132*c* is configured to generate vertically-polarized signal 120*c* to transmit antenna 114*c* for transmission. Vertically-polarized input 136*d*, for example, from master chip 180 in FIG. 1A, is provided to a transmitting circuit having phase shifter 124*h* and power amplifier (PA) 132*d*, where phase shifter 124*h* is configured to generate an output to PA 132*d*, and PA 132*d* is configured to generate vertically-polarized signal 120*d* to transmit antenna 114*d* for transmission.

As further illustrated in FIG. 1B, control bus 110*c* is provided to RF front end chip 108*a*, where control bus 110*c* is configured to provide phase shift information/signals to phase shifters 124*e*, 124*f*, 124*g* and 124*h* in RF front end chip 108*a* to cause a phase shift in at least one of vertically-polarized inputs 136*a*, 136*b*, 136*c* and 136*d*. Control bus 110*c* is also configured to provide amplitude control information/signals to PAs 132*a*, 132*b*, 132*c* and 132*d* in RF front end chip 108*a* to cause an amplitude change in at least one of vertically-polarized inputs 136*a*, 136*b*, 136*c* and 136*d*.

In another implementation, receive antennas 112*a* 112*b*, 112*c* and 112*d* are vertical-polarization antennas, which are configured to provide vertically-polarized signals 118*a*, 118*b*, 118*c* and 118*d*, respectively, to RF front end chip 106*a*. In this implementation, transmit antennas 114*a* 114*b*, 114*c* and 114*d* are horizontal-polarization antennas, where RF front end chip 108*a* is configured to provide horizontally-polarized signals 120*a*, 120*b*, 120*c* and 120*d* to transmit antennas 114*a* 114*b*, 114*c* and 114*d*, respectively, for transmission.

As illustrated in FIG. 1B, in one implementation, receive antennas 112*a* 112*b*, 112*c* and 112*d* are left-hand circular-polarization receive antennas, which are configured to provide left-hand circularly-polarized signals 118*a*, 118*b*, 118*c* and 118*d*, respectively, to RF front end chip 106*a*. In this implementation, transmit antennas 114*a* 114*b*, 114*c* and 114*d* are right-hand circular-polarization transmit antennas, where RF front end chip 108*a* is configured to provide right-hand circularly-polarized signals 120*a*, 120*b*, 120*c* and 120*d* to transmit antennas 114*a* 114*b*, 114*c* and 114*d*, respectively, for transmission.

In yet another implementation, receive antennas 112*a* 112*b*, 112*c* and 112*d* are right-hand circular-polarization receive antennas, that are configured to provide right-hand circularly-polarized signals 118*a*, 118*b*, 118*c* and 118*d*, respectively, to RF front end chip 106*a*. In this implementation, transmit antennas 114*a* 114*b*, 114*c* and 114*d* are left-hand circular-polarization transmit antennas, where RF front end chip 108*a* is configured to provide left-hand circularly-polarized signals 120*a*, 120*b*, 120*c* and 120*d* to transmit antennas 114*a* 114*b*, 114*c* and 114*d*, respectively, for transmission.

As can be seen in FIG. 1B, receive antennas 112*a* through 112*d* are of a first polarization, while transmit antennas 114*a* through 114*d* are of a second polarization, where the first and second polarizations (e.g., horizontal and vertical polarizations, or right-hand circular polarization and left-hand circular polarizations) are orthogonal to each other. As a result, the signals transmitted by transmit antennas 114*a* through 114*d* and the signals received by receive antennas 112*a* through 112*d* are isolated from each other. In addition, because the present implementation utilizes only one polarization for transmission and only an orthogonal polarization for reception, interference among transmit or receive signals can also be effectively eliminated, thereby substantially reducing the bit error rate of the wireless transceiver.

Figure 2A:
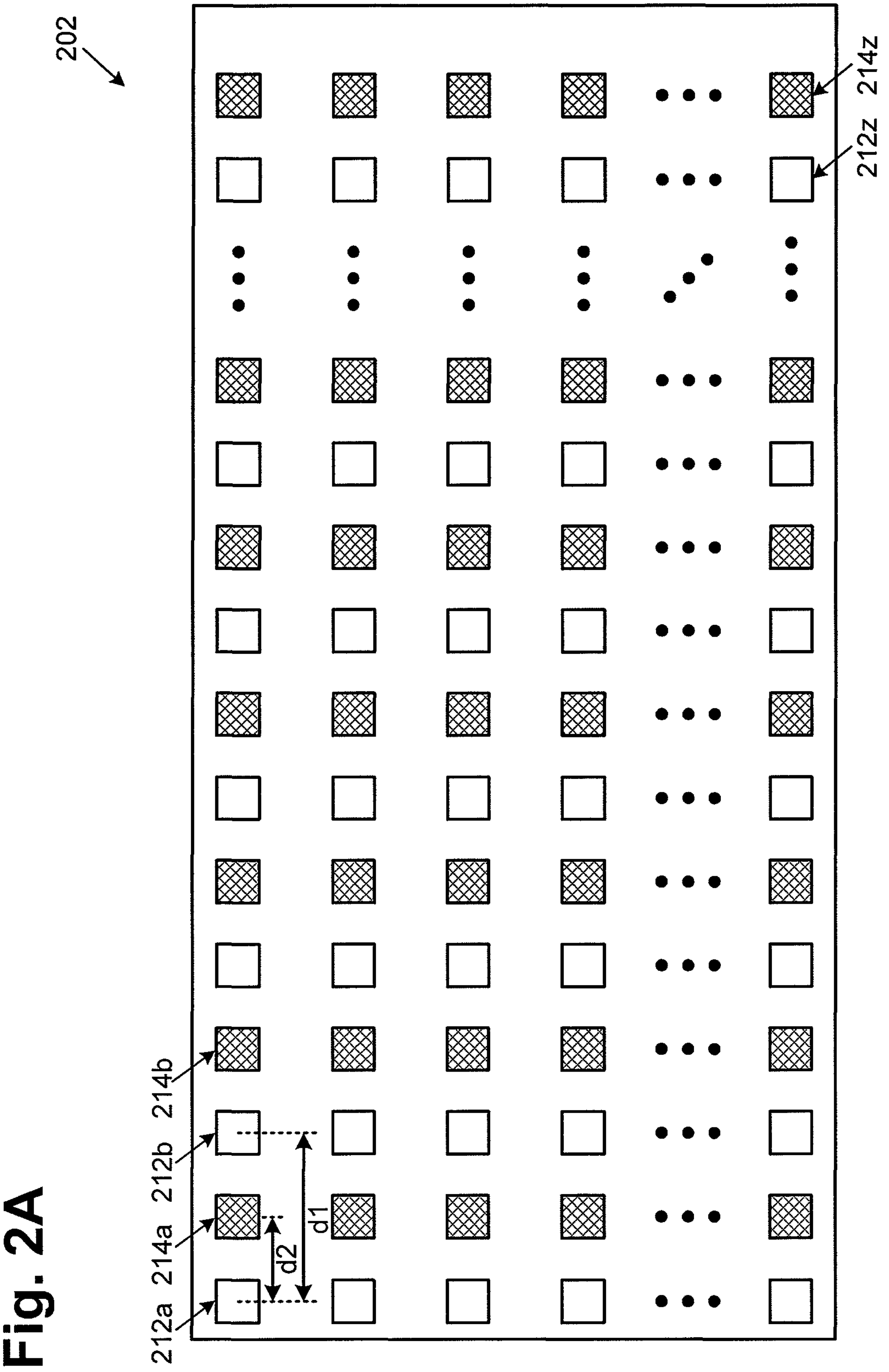
FIG. 2A illustrates a top plan view of a portion of a phased array antenna panel of an exemplary wireless transceiver according to one implementation of the present application.

Referring now to FIG. 2A, FIG. 2A illustrates a top plan view of a portion of a phased array antenna panel of an exemplary wireless transceiver according to one implementation of the present application. As illustrated in FIG. 2A, phased array antenna panel 202 includes receive antennas of a first polarization, such as receive antennas 212*a*, 212*b* and 212*z* (collectively referred to as receive antennas 212*a* through 212*z*). Phased array antenna panel 202 also includes transmit antennas of a second polarization that is orthogonal to the first polarization, such as transmit antennas 214*a*, 214*b* and 214*z* (collectively referred to as transmit antennas 214*a* through 214*z*). As illustrated in FIG. 2A, receive antennas 212*a* through 212*z* and transmit antennas 214*a* through 214*z* form an alternating configuration where receive antennas 212*a* through 212*z* and transmit antennas 214*a* through 214*z* are approximately evenly interspaced in phased array antenna panel 202.

As shown in FIG. 2A, receive antennas 212*a* and 212*b* are separated by distance d1, while receive antenna 212*a* and transmit antenna 214*a* are separated by distance d2. In the present implementation, d1=2×d2. In other words, each of the transmit antennas is approximately half-way between two of the receive antennas. In another implementation, there may be multiple transmit antennas between every pair of immediately adjacent receive antennas. In one implementation, the total number of receive antennas 212*a* through 212*z* is equal to the total number of transmit antennas 214*a* through 214*z*. In another implementation, the total number of receive antennas 212*a* through 212*z* and the total number of transmit antennas 214*a* through 214*z* may vary to suit the specific needs of a particular application.

As illustrated in FIG. 2A, in the present implementation, receive antennas 212*a* through 212*z* and transmit antennas 214*a* through 214*z* in phased array antenna panel 202 may each have a substantially square shape of substantially equal size, where the receive frequency and the transmit frequency of the wireless transceiver are set to be the same. In another implementation, transmit antennas 214*a* through 214*z* may be slightly smaller than receive antennas 212*a* through 212*z*, where the receive frequency and the transmit frequency of the wireless transceiver are set to be different. For example, receive antennas 212*a* through 212*z* in phased array antenna panel 202 may receive signals having a receive frequency of approximately 10 GHz, while transmit antennas 214*a* through 214*z* in phased array antenna panel 202 may transmit signals having a transmit frequency of approximately 12 GHz. As such, the receive frequency and the transmit frequency are separated by approximately 2 GHz, for example, to further improve signal isolation between the receive and transmit signals.

In one implementation, receive antennas 212*a* through 212*z* in phased array antenna panel 202 as shown in FIG. 2A, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., λ≈30 mm), each receive antenna in phased array antenna panel 202 needs an area of at least a quarter wavelength (e.g., λ/4≈7.5 mm) by a quarter wavelength (e.g., λ/4≈7.5 mm) to receive the transmitted signals. As illustrated in FIG. 2A, receive antennas 212*a* through 212*z* in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., n*λ/4), such as 7.5 mm, 15 mm, 22.5 mm, and etc.

In one implementation, transmit antennas 214*a* through 214*z* in phased array antenna panel 202 as shown in FIG. 2A, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214*a* through 214*z* may transmit signals at 10 GHz (i.e., λ≈30 mm) to a wireless receiver, such as satellite 460 in FIG. 4, where each transmit antenna in phased array antenna panel 202 needs an area of at least a quarter wavelength (e.g., λ/4≈7.5 mm) by a quarter wavelength (e.g., λ/4≈7.5 mm) to transmit the signals. As illustrated in FIG. 2A, transmit antennas 214*a* through 214*z* in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., n*λ/4), such as 7.5 mm, 15 mm, 22.5 mm, and etc.

In another implementation, transmit antennas 214*a* through 214*z* may transmit signals at 12 GHz (i.e., λ≈25 mm) to a wireless receiver, such as satellite 460 in FIG. 4. Each transmit antenna in phased array antenna panel 202 needs an area of at least a quarter wavelength (e.g., λ/4≈6.25 mm) by a quarter wavelength (e.g., λ/4≈6.25 mm) to transmit signals at 12 GHz. In one implementation, each adjacent pair of transmit antennas may be separated by a distance of a multiple integer of the quarter wavelength (i.e., n*λ/4), such as 6.25 mm, 12.5 mm, 18.75 mm, and etc.

In yet another implementation, using much smaller antenna sizes, transmit antennas 214*a* through 214*z* in phased array antenna panel 202 may be configured to transmit signals in the 60 GHz frequency range, while receive antennas 212*a* through 212*z* in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214*a* through 214*z* and receive antennas 212*a* through 212*z* in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212*a* through 212*z* and transmit antennas 214*a* through 214*z*, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106*a*, 106*b*, 107 and 106*x* in FIG. 1A) associated with receive antennas 212*a* through 212*z*. In one implementation, the transmission beam is formed fully electronically by means of phase and amplitude control circuits, for example, in RF front end circuits (such as RF front end chips 108*a*, 108*b*, 107 and 108*x* in FIG. 1A) associated with transmit antennas 214*a* through 214*z*. Thus, phased array antenna panel 202 can provide for beamforming for both reception and transmission without the use of any mechanical parts, thereby reducing signal delay, implementation cost and complexity.

Figure 2B:
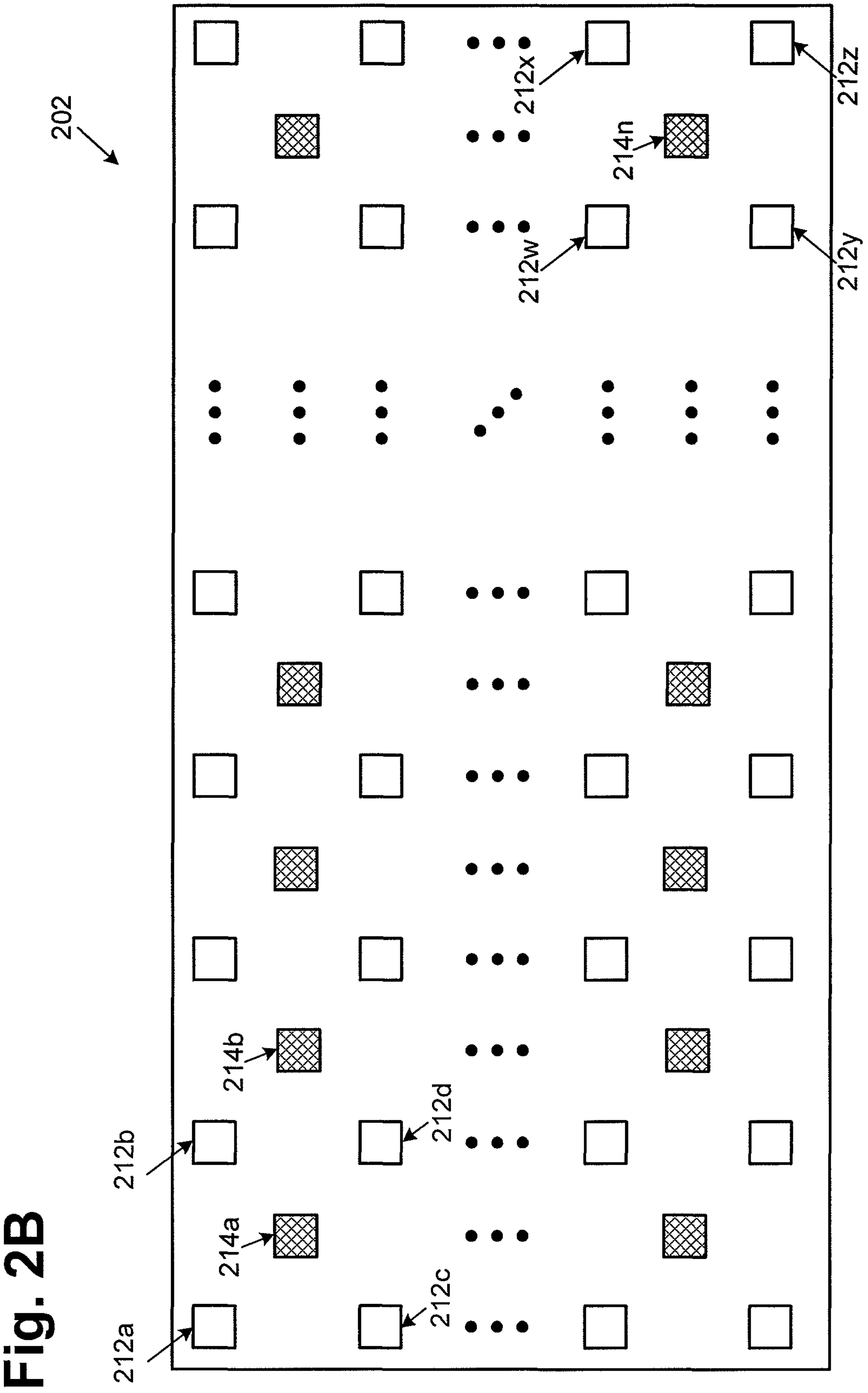
FIG. 2B illustrates a top plan view of a portion of a phased array antenna panel of an exemplary wireless transceiver according to one implementation of the present application.

Referring now to FIG. 2B, FIG. 2B illustrates a top plan view of a portion of a phased array antenna panel of an exemplary wireless transceiver according to one implementation of the present application. As illustrated in FIG. 2B, phased array antenna panel 202 includes receive antennas, such as receive antennas 212*a*, 212*b*, 212*c*, 212*d*, 212*w*, 212*x*, 212*y* and 212*z* (collectively referred to as receive antennas 212*a* through 212*z*). Phased array antenna panel 202 also includes transmit antennas, such as transmit antennas 214*a*, 214*b* and 214*n* (collectively referred to as transmit antennas 214*a* through 214*n*).

As illustrated in FIG. 2B, receive antennas 212*a* through 212*z* and transmit antennas 214*a* through 214*n* form a staggered row configuration where receive antennas 212*a* through 212*z* and transmit antennas 214*a* through 214*n* are arranged in staggered rows. As illustrated in FIG. 2B, transmit antenna 214*a* is approximately centered between receive antennas 212*a*, 212*b*, 212*c* and 212*d*, where transmit antenna 214*a* is spaced from each of receive antennas 212*a*, 212*b*, 212*c* and 212*d* at substantially equal distances. Similarly, transmit antenna 214*n* is approximately centered between receive antennas 212*w*, 212*x*, 212*y* and 212*z*, where transmit antenna 214*n* is spaced from each of receive antennas 212*w*, 212*x*, 212*y* and 212*z* at substantially equal distances. In another implementation, there may be multiple transmit antennas between every group of four receive antennas. In one implementation, the total number of receive antennas 212*a* through 212*z* is greater than the total number of transmit antennas 214*a* through 214*n*. In another implementation, the total number of receive antennas 212*a* through 212*z* and the total number of transmit antennas 214*a* through 214*n* may vary to suit the specific needs of a particular application.

As illustrated in FIG. 2B, receive antennas 212*a* through 212*z* and transmit antennas 214*a* through 214*n* in phased array antenna panel 202 may each have a substantially square shape of substantially equal size, where the receive frequency and the transmit frequency of the wireless transceiver are set to be the same. In another implementation, transmit antennas 214*a* through 214*n* may be slightly smaller than receive antennas 212*a* through 212*z*, where the receive frequency and the transmit frequency of the wireless transceiver are set to be different. For example, receive antennas 212*a* through 212*z* in phased array antenna panel 202 may receive signals having a receive frequency of approximately 10 GHz, while transmit antennas 214*a* through 214*n* in phased array antenna panel 202 may transmit signals having a transmit frequency of approximately 12 GHz. As such, the receive frequency and the transmit frequency are separated by approximately 2 GHz to further improve signal isolation between the receive and transmit signals.

In one implementation, receive antennas 212*a* through 212*z* in phased array antenna panel 202 as shown in FIG. 2B, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive the transmitted signals. As illustrated in FIG. 2B, receive antennas 212*a* through 212*z* in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., $n^*\lambda/4$), such as 7.5 mm, 15 mm, 22.5 mm, and etc.

In one implementation, transmit antennas 214*a* through 214*n* in phased array antenna panel 202 as shown in FIG. 2B, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214*a* through 214*n* may transmit signals at 10 GHz (i.e., $\lambda \approx 30$ mm) to a wireless receiver, such as satellite 460 in FIG. 4, where each transmit antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to transmit the signals. As illustrated in FIG. 2B, transmit antennas 214*a* through 214*n* in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., $n^*\lambda/4$), such as 7.5 mm, 15 mm, 22.5 mm, and etc.

In another implementation, transmit antennas 214*a* through 214*n* may transmit signals at 12 GHz (i.e., $\lambda \approx 25$ mm) to a wireless receiver, such as satellite 460 in FIG. 4. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals at 12 GHz. In one implementation, each adjacent pair of transmit antennas may be separated by a distance of a multiple integer of the quarter wavelength (i.e., $n^*\lambda/4$), such as 6.25 mm, 12.5 mm, 18.75 mm, and etc.

In yet another implementation, using much smaller antenna sizes, transmit antennas 214*a* through 21411 in phased array antenna panel 202 may be configured to transmit signals in the 60 GHz frequency range, while receive antennas 212*a* through 212*z* in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214*a* through 214*n* and receive antennas 212*a* through 212*z* in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212*a* through 212*z* and transmit antennas 214*a* through 214*n*, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106*a*, 106*b*, 107 and 106*x* in FIG. 1A) associated with receive antennas 212*a* through 212*z*. In one implementation, the transmission beam is formed fully electronically by means of phase and amplitude control circuits, for example, in RF front end circuits (such as RF front end chips 108*a*, 108*b*, 107 and 108*x* in FIG. 1A) associated with transmit antennas 214*a* through 214*n*. Thus, phased array antenna panel 202 can provide for beamforming for both reception and transmission without the use of any mechanical parts, thereby reducing signal delay, implementation cost and complexity.

Figure 2C:
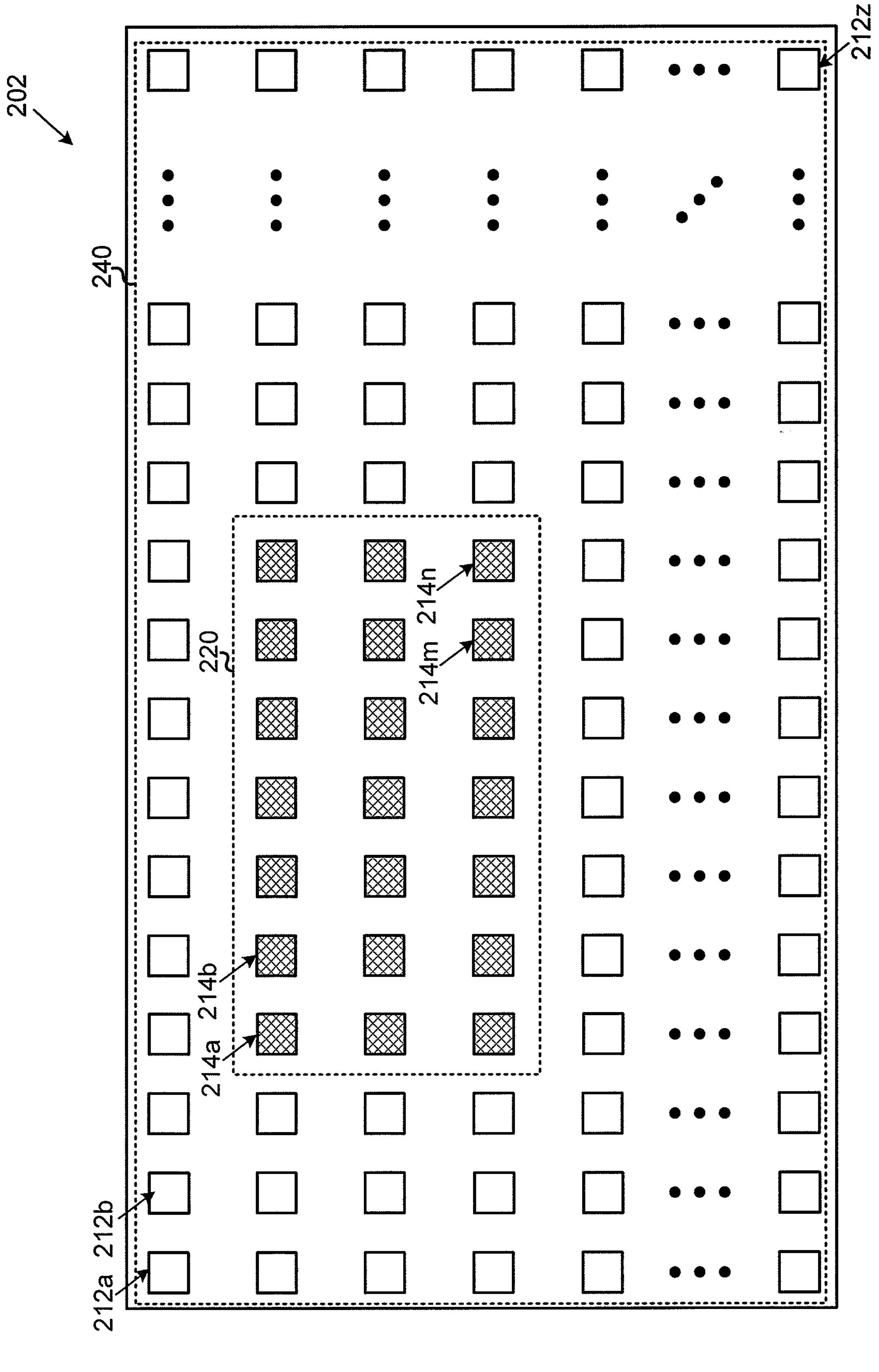
FIG. 2C illustrates a top plan view of a portion of a phased array antenna panel of an exemplary wireless transceiver according to one implementation of the present application.

Referring now to FIG. 2C, FIG. 2C illustrates a top plan view of a portion of a phased array antenna panel of an exemplary wireless transceiver according to one implementation of the present application. As illustrated in FIG. 2C, phased array antenna panel 202 includes receive antennas, such as receive antennas 212*a*, 212*b* and 212*z* (collectively referred to as receive antennas 212*a* through 212*z*). Phased array antenna panel 202 also includes transmit antennas, such as transmit antennas 214*a*, 214*b*, 214*m* and 214*n* (collectively referred to as transmit antennas 214*a* through 214*n*).

As illustrated in FIG. 2C, receive antennas 212*a* through 212*z* are in receive configuration 240. In the present implementation, receive configuration 240 includes a cluster of receive antennas. Transmit antennas 214*a* through 214*n* are in transmit configuration 220. In the present implementation, transmit configuration 220 includes a rectangular cluster of transmit antennas. As illustrated in FIG. 2C, the cluster of transmit antennas 214*a* through 214*n* is a rectangular cluster of transmit antennas surrounded by the cluster of receive antennas 212*a* through 212*z*. In one implementation, the total number of receive antennas 212*a* through 212*z* is greater than the total number of transmit antennas 214*a* through 214*n*. In another implementation, the number of receive antennas in receive configuration 240 and the number of transmit antennas in transmit configuration 220 may vary to suit the specific needs of a particular application.

As illustrated in FIG. 2C, similar to FIGS. 2A and 2B, receive antennas 212*a* through 212*z* and transmit antennas 214*a* through 214*n* in phased array antenna panel 202 may each have a substantially square shape of substantially equal size, where the receive frequency and the transmit frequency of the wireless transceiver are set to be the same. In another implementation, transmit antennas 214*a* through 214*n* may be slightly smaller than receive antennas 212*a* through 212*z*, where the receive frequency and the transmit frequency of the wireless transceiver are set to be different. For example, receive antennas 212*a* through 212*z* in phased array antenna panel 202 may receive signals having a receive frequency of approximately 10 GHz, while transmit antennas 214*a* through 214*n* in phased array antenna panel 202 may transmit signals having a transmit frequency of approximately 12 GHz. As such, the receive frequency and the transmit frequency are separated by approximately 2 GHz, for example, to further improve signal isolation between the receive and transmit signals.

In one implementation, receive antennas 212*a* through 212*z* in phased array antenna panel 202 as shown in FIG. 2C, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive the transmitted signals. As illustrated in FIG. 2C, receive antennas 212*a* through 212*z* in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., $n^*\lambda/4$), such as 7.5 mm, 15 mm, 22.5 mm, and etc.

In one implementation, transmit antennas 214*a* through 214*n* in phased array antenna panel 202 as shown in FIG. 2C, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214*a* through 214*n* may transmit signals at 10 GHz (i.e., $\lambda/4 \approx 30$ mm) to a wireless receiver, such as satellite 460 in FIG. 4, where each transmit antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to transmit the signals. As illustrated in FIG. 2C, transmit antennas 214*a* through 214*n* in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., $n^*\lambda/4$), such as 7.5 mm, 15 mm, 22.5 mm, and etc.

In another implementation, transmit antennas 214*a* through 214*n* may transmit signals at 12 GHz (i.e., $\lambda \approx 25$ mm) to a wireless receiver, such as satellite 460 in FIG. 4. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals at 12 GHz. In one implementation, each adjacent pair of transmit antennas may be separated by a distance of a multiple integer of the quarter wavelength (i.e., $n^*\lambda/4$), such as 6.25 mm, 12.5 mm, 18.75 mm, and etc.

In yet another implementation, using much smaller antenna sizes, transmit antennas 214*a* through 214*n* in phased array antenna panel 202 may be configured to transmit signals in the 60 GHz frequency range, while receive antennas 212*a* through 212*z* in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214*a* through 214*n* and receive antennas 212*a* through 212*z* in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212*a* through 212*z* and transmit antennas 214*a* through 214*n*, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106*a*, 106*b*, 107 and 106*x* in FIG. 1A) associated with receive antennas 212*a* through 212*z*. In one implementation, the transmission beam is formed fully electronically by means of phase and amplitude control circuits, for example, in RF front end circuits (such as RF front end chips 108*a*, 108*b*, 107 and 108*x* in FIG. 1A) associated with transmit antennas 214*a* through 214*n*. Thus, phased array antenna panel 202 can provide for beamforming for both reception and transmission without the use of any mechanical parts, thereby reducing signal delay, implementation cost and complexity.

Figure 2D:
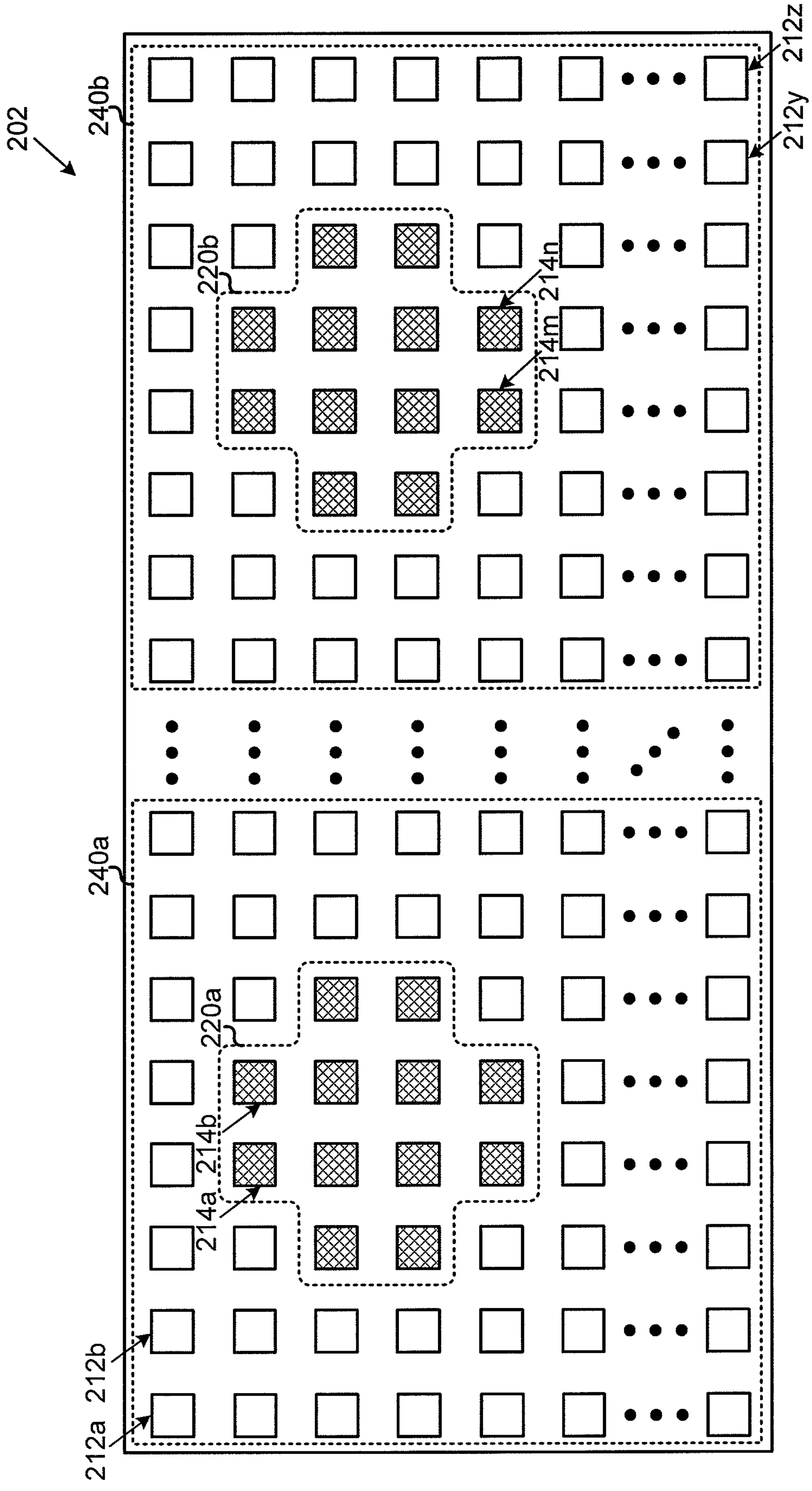
FIG. 2D illustrates a top plan view of a portion of a phased array antenna panel of an exemplary wireless transceiver according to one implementation of the present application.

Referring now to FIG. 2D, FIG. 2D illustrates a top plan view of a portion of a phased array antenna panel of an exemplary wireless transceiver according to one implementation of the present application. As illustrated in FIG. 2D, phased array antenna panel 202 includes receive antennas, such as receive antennas 212*a*, 212*b*, 212*y* and 212*z* (collectively referred to as receive antennas 212*a* through 212*z*). Phased array antenna panel 202 also includes transmit antennas, such as transmit antennas 214*a*, 214*b*, 214*m* and 214*n* (collectively referred to as transmit antennas 214*a* through 214*n*).

As illustrated in FIG. 2D, a portion of receive antennas 212*a* through 212*z* are in receive configuration 240*a*, while another portion of receive antennas 212*a* through 212*z* are in receive configuration 240*b*. In the present implementation, each of receive configurations 240*a* and 240*b* includes a cluster of receive antennas. As further illustrated in FIG. 2D, a portion of transmit antennas 214*a* through 214*n* is in transmit configuration 220*a*, while another portion of transmit antennas 214*a* through 214*n* is in transmit configuration 220*b*. In the present implementation, each of transmit configurations 220*a* and 220*b* is a non-rectangular cluster of transmit antennas. In one implementation, the total number of receive antennas 212*a* through 212*z* is greater than the total number of transmit antennas 214*a* through 214*n*. In another implementation, the number of receive antennas in receive configuration 240*a* and the number of transmit antennas in transmit configuration 220*a* may vary to suit the needs of a particular application. Similarly, the number of receive antennas in receive configuration 240*b* and the number of transmit antennas in transmit configuration 220*b* may vary to suit the needs of a particular application.

As illustrated in FIG. 2D, receive antennas 212*a* through 212*z* and transmit antennas 214*a* through 214*n* in phased array antenna panel 202 may each have a substantially square shape of substantially equal size, where the receive frequency and the transmit frequency of the wireless transceiver are set to be the same. In another implementation, transmit antennas 214*a* through 214*n* may be slightly smaller than receive antennas 212*a* through 212*z*, where the receive frequency and the transmit frequency of the wireless transceiver are set to be different. For example, receive antennas 212*a* through 212*z* in phased array antenna panel 202 may receive signals having a receive frequency of approximately 10 GHz, while transmit antennas 214*a* through 214*n* in phased array antenna panel 202 may transmit signals having a transmit frequency of approximately 12 GHz. As such, the receive frequency and the transmit frequency are separated by approximately 2 GHz, for example, to further improve signal isolation between the receive and transmit signals.

In one implementation, receive antennas 212*a* through 212*z* in phased array antenna panel 202 as shown in FIG. 2D, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive the transmitted signals. As illustrated in FIG. 2D, receive antennas 212*a* through 212*z* in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., $n^*\lambda/4$), such as 7.5 mm, 15 mm, 22.5 mm, and etc.

In one implementation, transmit antennas 214*a* through 214*n* in phased array antenna panel 202 as shown in FIG. 2D, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214*a* through 214*n* may transmit signals at 10 GHz (i.e., $\lambda \approx 30$ mm) to a wireless receiver, such as satellite 460 in FIG. 4, where each transmit antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to transmit the signals. As illustrated in FIG. 2D, transmit antennas 214*a* through 214*n* in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., $n^*\lambda/4$), such as 7.5 mm, 15 mm, 22.5 mm, and etc.

In another implementation, transmit antennas 214*a* through 214*n* may transmit signals at 12 GHz (i.e., $\lambda \approx 25$ mm) to a wireless receiver, such as satellite 460 in FIG. 4. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals at 12 GHz. In one implementation, each adjacent pair of transmit antennas may be separated by a distance of a multiple integer of the quarter wavelength (i.e., $n^*\lambda/4$), such as 6.25 mm, 12.5 mm, 18.75 mm, and etc.

In yet another implementation, using much smaller antenna sizes, transmit antennas 214*a* through 214*n* in phased array antenna panel 202 may be configured to transmit signals in the 60 GHz frequency range, while receive antennas 212*a* through 212*z* in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214*a* through 214*n* and receive antennas 212*a* through 212*z* in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212*a* through 212*z* and transmit antennas 214*a* through 214*n*, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106*a*, 106*b*, 107 and 106*x* in FIG. 1A) associated with receive antennas 212*a* through 212*z*. In one implementation, the transmission beam is formed fully electronically by means of phase and amplitude control circuits, for example, in RF front end circuits (such as RF front end chips 108*a*, 108*b*, 107 and 108*x* in FIG. 1A) associated with transmit antennas 214*a* through 214*n*. Thus, phased array antenna panel 202 can provide for beamforming for both reception and transmission without the use of any mechanical parts, thereby reducing signal delay, implementation cost and complexity.

Figure 3A:
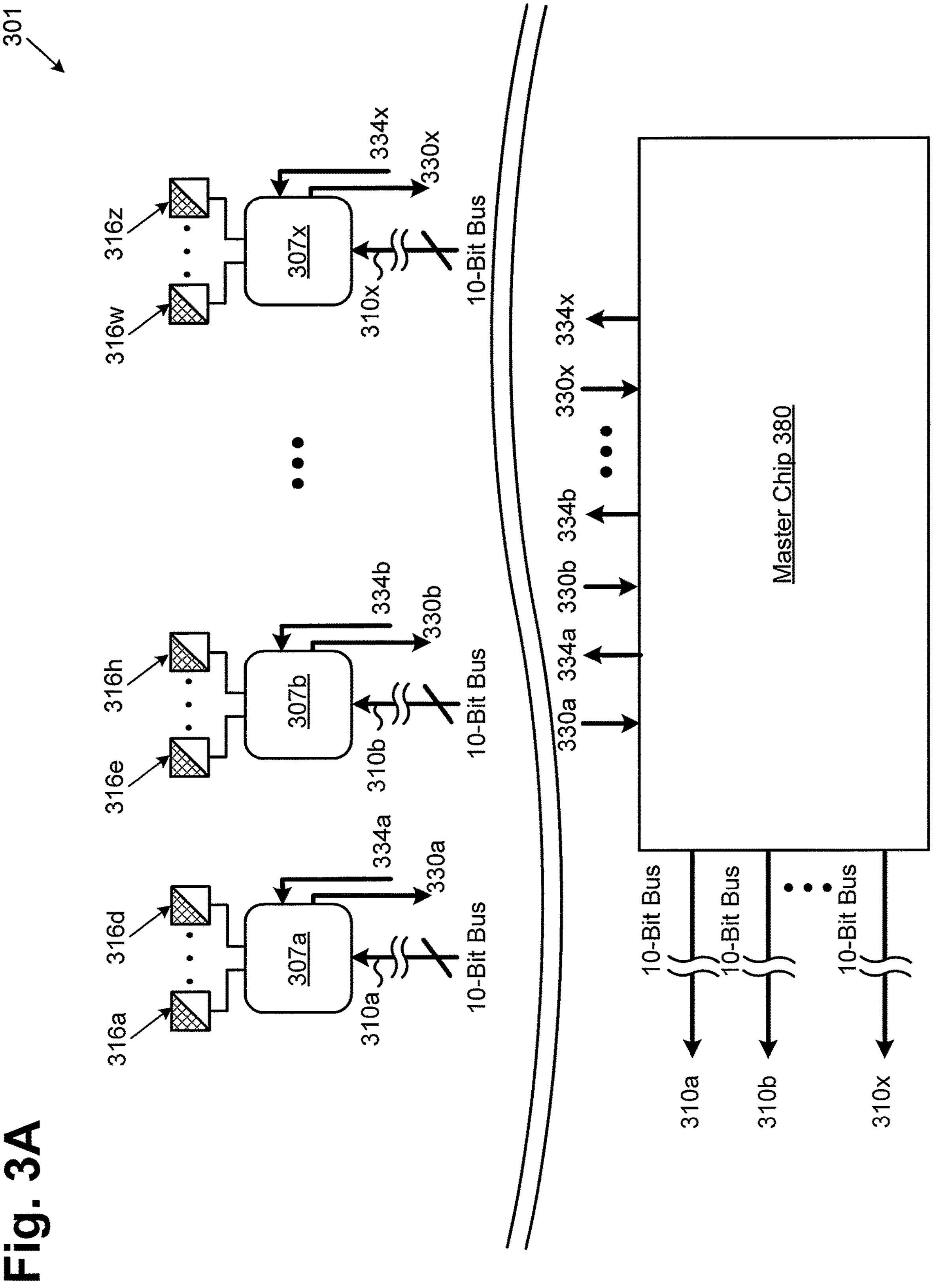
FIG. 3A illustrates a functional block diagram of a portion of an exemplary wireless transceiver according to one implementation of the present application.

Referring now to FIG. 3A, FIG. 3A illustrates a functional block diagram of a portion of an exemplary wireless transceiver according to one implementation of the present application. As illustrated in FIG. 3A, wireless transceiver 301 includes radio frequency (RF) front end chips 307*a*, 307*b* and 307*x* (collectively referred to as RF front end chips 307*a* through 307*x*), reconfigurable receive/transmit antennas 316*a*, 316*d*, 316*e*, 316*h*, 316*w* and 316*z* (collectively referred to as reconfigurable receive/transmit antennas 316*a* through 316*z*), and master chip 380. In the present implementation, wireless transceiver 301 includes reconfigurable receive/transmit antennas 316*a* through 316*z* in a single phased array antenna panel for transmitting and receiving wireless signals.

As can be seen in FIG. 3A, RF front end chip 307*a* is connected to a group of reconfigurable receive/transmit antennas, such as reconfigurable receive/transmit antennas 316*a* and 316*d*. RF front end chip 307*b* is connected to a group of reconfigurable receive/transmit antennas, such as reconfigurable receive/transmit antennas 316*e* and 316*h*. Also, RF front end chip 307*x* is connected to a group of reconfigurable receive/transmit antennas, such as reconfigurable receive/transmit antennas 316*w* and 316*z*. It should be noted that total numbers of reconfigurable receive/transmit antennas may vary to suit the specific needs of a particular application.

In the present implementation, wireless transceiver 301 may pair with another wireless transceiver, such as satellite 460 or wireless transceiver 401*a*/401*b*/401*c*/401*d* in FIG. 4, through a handshake procedure to establish conventions for transmission and reception polarizations. Once the pair of wireless transceivers coordinate and establish their respective polarizations, they can transmit and receive wireless communications signals using the established transmission and reception polarizations.

In the present implementation, master chip 380 and/or RF front end chips 307*a* through 307*x* can set some or all reconfigurable receive/transmit antennas 316*a* through 316*z* to be receive antennas of a first polarization during a reception mode, and set some or all reconfigurable receive/transmit antennas 316*a* through 316*z* to be transmit antennas of a second polarization during a transmission mode. In this manner, reconfigurable receive/transmit antennas 316*a* through 316*z* can support a reception mode that is compatible for a pairing transceiver by reconfiguring antennas 316*a* through 316*z* to, for example, receive only horizontally-polarized signals for a period of time (or indefinitely if so desired), or receive only vertically-polarized signals for another period of time (or indefinitely if so desired). Similarly, reconfigurable receive/transmit antennas 316*a* through 316*z* can support a transmission mode that is compatible for a pairing transceiver by reconfiguring antennas 316*a* through 316*z* to, for example, transmit only horizontally-polarized signals for a period of time (or indefinitely if so desired), or transmit only vertically-polarized signals for another period of time (or indefinitely, if so desired).

Moreover, master chip 380 and/or RF front end chips 307*a* through 307*x* can set a first group of reconfigurable receive/transmit antennas 316*a* through 316*z* to be receive antennas of a first polarization, and set a second group of reconfigurable receive/transmit antennas 316*a* through 316*z* to be transmit antennas of a second polarization. In this manner, the first group of reconfigurable receive/transmit antennas 316*a* through 316*z* can support a reception mode that is compatible with a pairing transceiver and receive only horizontally-polarized signals or receive only vertically-polarized signals, while the second group of reconfigurable receive/transmit antennas 316*a* through 316*z* can support a transmission mode that is compatible with a pairing transceiver and transmit only vertically-polarized signals or transmit only horizontally-polarized signals.

Because the first polarization and the second polarization are orthogonal to each other, the signals transmitted by reconfigurable receive/transmit antennas 316*a* through 316*z* and the signals received by reconfigurable receive/transmit antennas 316*a* through 316*z* are isolated from each other. In addition, because the present implementation utilizes only one polarization for transmission and only an orthogonal polarization for reception, interference among transmit and/or receive signals can also be effectively eliminated, thereby substantially reducing the bit error rate of the wireless transceiver.

As stated above, in the present implementation, each of reconfigurable receive/transmit antennas 316*a* through 316*z* may be a linear-polarization receive antenna. In the present implementation, one or more reconfigurable receive/transmit antennas 316*a* through 316*z* may be configured to be horizontal-polarization receive antennas for receiving horizontally-polarized signals during the reception mode in one period of time, while in the transmission mode in another period of time, reconfigurable receive/transmit antennas 316*a* through 316*z* may be configured to be vertical-polarization transmit antennas for transmitting vertically-polarized signals. For example, reconfigurable receive/transmit antennas 316*a* and 316*d* may each provide a horizontally-polarized signal to RF front end chip 307*a*, which combines the horizontally-polarized signals, by adding powers and combining phases of the individual horizontally-polarized signals from reconfigurable receive/transmit antennas 316*a* and 316*d*, and provides combined signal 330*a* (i.e., a horizontally polarized combined signal) to master chip 380. Similarly, reconfigurable receive/transmit antennas 316*e* and 316*h* may each provide a horizontally-polarized signal to RF front end chip 307*b*, which combines the horizontally-polarized signals, by adding powers and combining phases of the individual horizontally-polarized signals from reconfigurable receive/transmit antennas 316*e* and 316*h*, and provides combined signal 330*b* (i.e., a horizontally polarized combined signal) to master chip 380. Reconfigurable receive/transmit antennas 316*w* and 316*z* may each provide a horizontally-polarized signal to RF front end chip 307*x*, which combines the horizontally-polarized signals, by adding powers and combining phases of the individual horizontally-polarized signals from reconfigurable receive/transmit antennas 316*w* and 316*z*, and provides combined signal 330*x* (i.e., a horizontally polarized combined signal) to master chip 380.

While reconfigurable receive/transmit antennas 316*a* through 316*z* are in the transmission mode in another period of time, RF front end chip 307*a* may receive vertically polarized combined signal 334*a* from master chip 380, and provide vertically-polarized signals to reconfigurable receive/transmit antennas 316*a* and 316*d* for transmission. RF front end chip 307*b* may receive vertically polarized combined signal 334*b* from master chip 380, and provide vertically-polarized signals to reconfigurable receive/transmit antennas 316*e* and 316*h* for transmission. RF front end chip 307*x* may receive vertically polarized combined signal 334*x* from master chip 380, and provide vertically-polarized signals to reconfigurable receive/transmit antennas 316*w* and 316*z* for transmission.

In another implementation, one or more reconfigurable receive/transmit antennas 316*a* through 316*z* may be configured to be vertical-polarization receive antennas for receiving vertically-polarized signals during the reception mode in a period of time, while in the transmission mode in another period of time, reconfigurable receive/transmit antennas 316*a* through 316*z* may be configured to be horizontal-polarization transmit antennas for transmitting horizontally-polarized signals. For example, reconfigurable receive/transmit antennas 316*a* and 316*d* may each provide a vertically-polarized signal to RF front end chip 307*a*, which combines the vertically-polarized signals, by adding powers and combining phases of the individual vertically-polarized signals from reconfigurable receive/transmit antennas 316*a* and 316*d*, and provides combined signal 330*a* (i.e., a vertically-polarized combined signal) to master chip 380. Similarly, reconfigurable receive/transmit antennas 316*e* and 316*h* may each provide a vertically-polarized signal to RF front end chip 307*b*, which combines the vertically-polarized signals, by adding powers and combining phases of the individual vertically-polarized signals from reconfigurable receive/transmit antennas 316*e* and 316*h*, and provides combined signal 330*b* (i.e., a vertically-polarized combined signal) to master chip 380. Reconfigurable receive/transmit antennas 316*w* and 316*z* may each provide a vertically-polarized signal to RF front end chip 307*x*, which combines the vertically-polarized signals, by adding powers and combining phases of the individual vertically-polarized signals from reconfigurable receive/transmit antennas 316*w* and 316*z*, and provides combined signal 330*x* (i.e., a vertically-polarized combined signal) to master chip 380.

While reconfigurable receive/transmit antennas 316*a* through 316*z* are in the transmission mode in another period of time, RF front end chip 307*a* may receive horizontally polarized combined signal 334*a* from master chip 380, and provide horizontally-polarized signals to reconfigurable receive/transmit antennas 316*a* and 316*d* for transmission. RF front end chip 307*b* may receive horizontally polarized combined signal 334*b* from master chip 380, and provide horizontally-polarized signals to reconfigurable receive/transmit antennas 316*e* and 316*h* for transmission. RF front end chip 307*x* may receive horizontally polarized combined signal 334*x* from master chip 380, and provides horizontally-polarized signals to reconfigurable receive/transmit antennas 316*w* and 316*z* for transmission.

In another implementation, each reconfigurable receive/transmit antennas, such as reconfigurable receive/transmit antennas 316*a* through 316*z*, may be a circular-polarization receive antenna. For example, one or more reconfigurable receive/transmit antennas 316*a* through 316*z* may be configured to be left-hand circular-polarization receive antennas for receiving left-hand circularly-polarized signals in one period of time, while in another period of time, reconfigurable receive/transmit antennas 316*a* through 316*z* may be configured to be right-hand circular-polarization transmit antennas for transmitting right-hand circularly-polarized signals. In yet another implementation, one or more reconfigurable receive/transmit antennas 316*a* through 316*z* may be configured to be right-hand circular-polarization receive antennas for receiving right-hand circularly-polarized signals in one period of time, while in another period of time, reconfigurable receive/transmit antennas 316*a* through 316*z* may be configured to be left-hand circular-polarization transmit antennas for transmitting left-hand circularly-polarized signals.

As illustrated in FIG. 3A, master chip 380 receives combined signals 330*a*, 330*b* and 330*x* from RF front end chips 307*a*, 307*b* and 307*x*, respectively. Master chip 380 provides combined signals 334*a*, 334*b* and 334*x* to RF front end chips 307*a*, 307*b* and 307*x*, respectively. In addition, master chip 380 also provides control bus 310*a*, 310*b* and 310*x* to RF front end chips 307*a*, 307*b* and 307*x*, respectively.

Figure 3B:
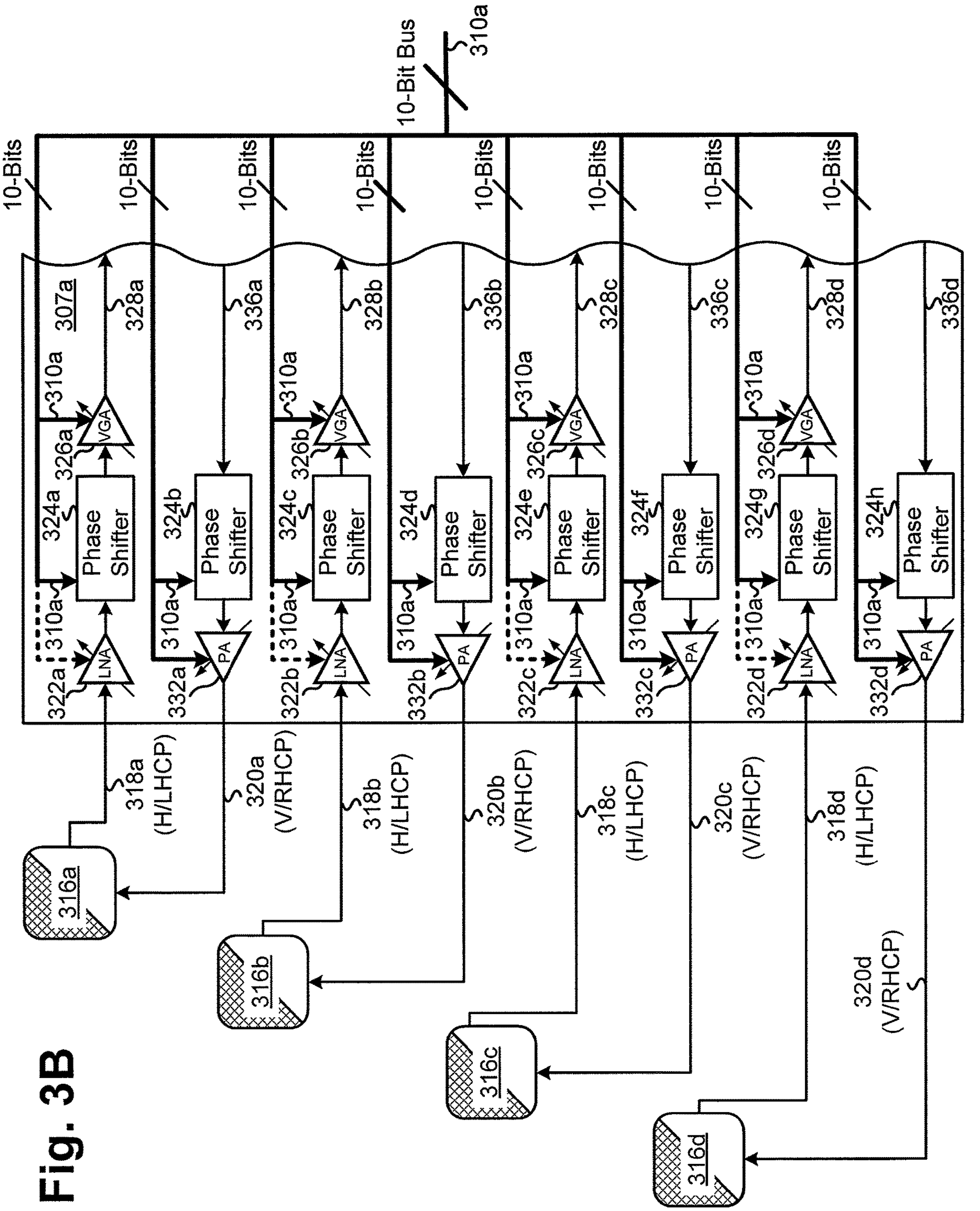
FIG. 3B illustrates a functional block diagram of a portion of an exemplary wireless transceiver according to one implementation of the present application.
Figure 3C:
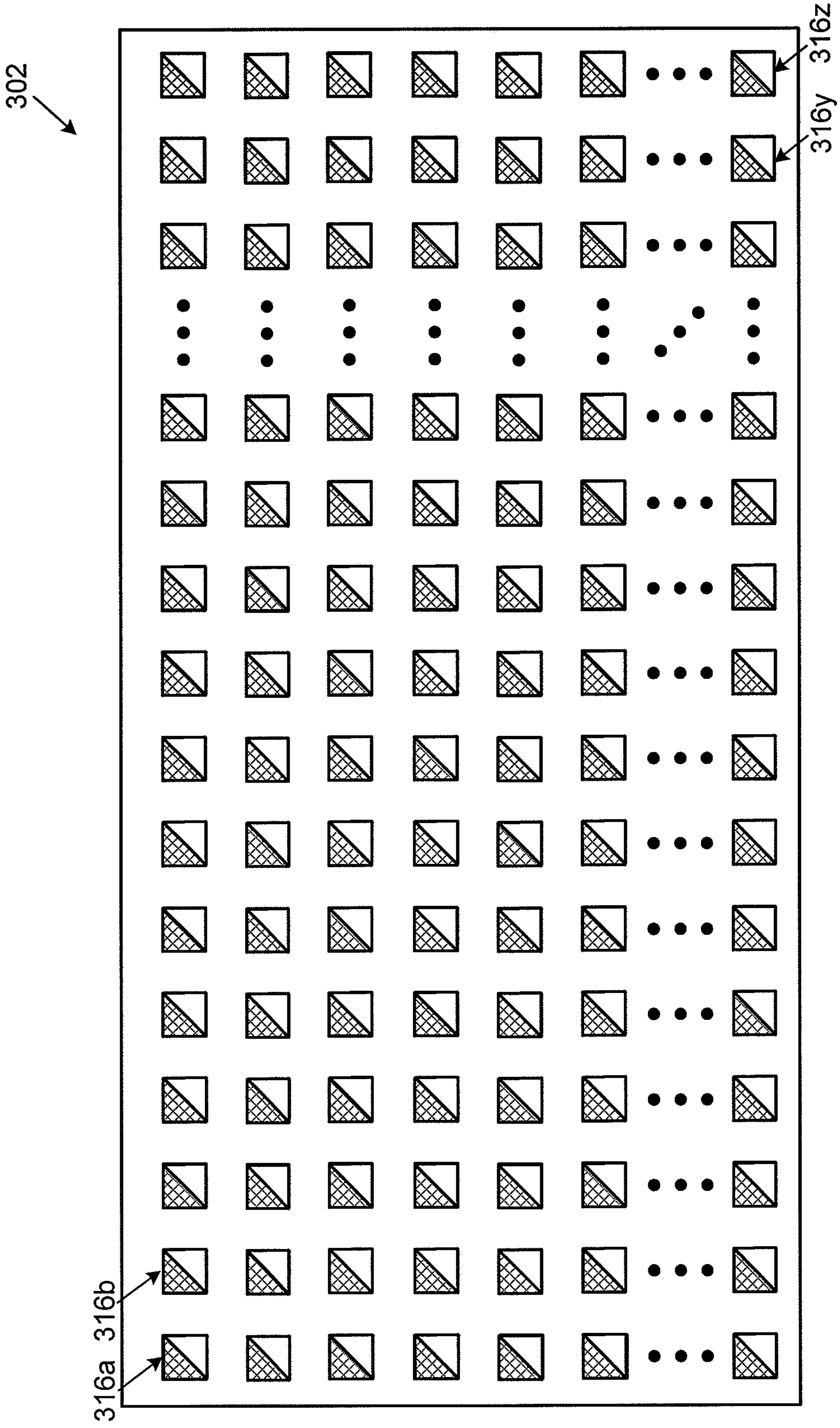
FIG. 3C illustrates a top plan view of a portion of a phased array antenna panel of an exemplary wireless transceiver according to one implementation of the present application.

In the present implementation, reconfigurable receive/transmit antennas 316*a* and 316*z*, while in the reception mode, form a receive beam at a receive frequency based on phase and amplitude information/signals provided by master chip 380 to corresponding RF front end chips 307*a*, 307*b* and 307*x* in a phased array antenna panel, such as phased array antenna panel 302 shown in FIG. 3C. Reconfigurable receive/transmit antennas 316*a* and 316*z*, while in the transmission mode, form a transmit beam at a transmit frequency based on phase and amplitude information provided by master chip 380 to corresponding RF front end chips 307*a*, 307*b* and 307*x* in the phased array antenna panel.

In one implementation, master chip 380 is configured to drive in parallel control buses 310*a* through 310*x*. By way of one example, and without limitation, control buses 310*a* through 310*x* are ten-bit control buses in the present implementation. In one implementation, RF front end chips 307*a*, 307*b* and 307*x*, and reconfigurable receive/transmit antennas 316*a* and 316*z* corresponding RF front end chips 307*a*, 307*b* and 307*x*, and master chip 380 are integrated on a single substrate, such as a printed circuit board.

FIG. 3B illustrates a functional block diagram of a portion of an exemplary wireless transceiver according to one implementation of the present application. With similar numerals representing similar features in FIG. 3A, FIG. 3B includes reconfigurable receive/transmit antennas 316*a*, 316*d*, 316*c* and 316*d* coupled to RF front end chip 307*a*.

In the present implementation, reconfigurable receive/transmit antennas 316*a*, 316*d*, 316*c* and 316*d* may be configured to receive signals from one or more wireless transceivers, such as commercial geostationary communication satellites or low earth orbit satellites having a very large bandwidth in the 10 GHz to 20 GHz frequency range and a very high data rate. In another implementation, reconfigurable receive/transmit antennas 316*a*, 316*d*, 316*c* and 316*d* may be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

As illustrated in FIG. 3B, in one implementation, reconfigurable receive/transmit antennas 316*a*, 316*d*, 316*c* and 316*d* may be configured to be horizontal-polarization receive antennas to provide horizontally-polarized signals 318*a*, 318*b*, 318*c* and 318*d*, respectively, to RF front end chip 307*a*. As shown in FIG. 3B, when the wireless transceiver is in the reception mode, horizontally-polarized signal 318*a* from reconfigurable receive/transmit antenna 316*a* is provided to a receive circuit having low noise amplifier (LNA) 322*a*, phase shifter 324*a* and variable gain amplifier (VGA) 326*a*, where LNA 322*a* is configured to generate an output to phase shifter 324*a*, and phase shifter 324*a* is configured to generate an output to VGA 326*a*. Horizontally-polarized signal 318*b* from reconfigurable receive/transmit antenna 316*b* is provided to a receive circuit having low noise amplifier (LNA) 322*b*, phase shifter 324*c* and variable gain amplifier (VGA) 326*b*, where LNA 322*b* is configured to generate an output to phase shifter 324*c*, and phase shifter 324*c* is configured to generate an output to VGA 326*b*. Horizontally-polarized signal 318*c* from reconfigurable receive/transmit antenna 316*c* is provided to a receive circuit having low noise amplifier (LNA) 322*c*, phase shifter 324*e* and variable gain amplifier (VGA) 326*c*, where LNA 322*c* is configured to generate an output to phase shifter 324*e*, and phase shifter 324*e* is configured to generate an output to VGA 326*c*. Horizontally-polarized signal 318*d* from reconfigurable receive/transmit antenna 316*d* is provided to a receive circuit having low noise amplifier (LNA) 322*d*, phase shifter 324*g* and variable gain amplifier (VGA) 326*d*, where LNA 322*d* is configured to generate an output to phase shifter 324*g*, and phase shifter 324*g* is configured to generate an output to VGA 326*d*.

As further illustrated in FIG. 3B, control bus 310*a* is provided to RF front end chip 307*a*, where control bus 310*a* is configured to provide phase shift information/signals to phase shifters 324*a*, 324*c*, 324*e* and 324*g* in RF front end chip 307*a* to cause a phase shift in at least one of horizontally-polarized signals 318*a*, 318*b*, 318*c* and 318*d*. Control bus 310*a* is also configured to provide amplitude control information/signals to VGAs 326*a*, 326*b*, 326*c* and 326*d*, and optionally to LNAs 322*a*, 322*b*, 322*c* and 322*d* in RF front end chip 307*a* to cause an amplitude change in at least one of horizontally-polarized signals 318*a*, 318*b*, 318*c* and 318*d*.

In one implementation, amplified and phase shifted horizontally-polarized signals 328*a*, 328*b*, 328*c* and 328*d* may be provided to a summation block (not explicitly shown in FIG. 3B), that is configured to sum all of the powers of the amplified and phase shifted horizontally-polarized signals to provide a combined signal to a master chip, such as combined signal 330*a* (i.e., a horizontally polarized combined signal) provided to master chip 380 in FIG. 3A.

As illustrated in FIG. 3B, when the wireless transceiver is in the transmission mode, reconfigurable receive/transmit antennas 316*a*, 316*d*, 316*c* and 316*d* may be configured to transmit signals to one or more wireless transceivers, such as commercial geostationary communication satellites or low earth orbit satellites having a very large bandwidth in the 10 GHz to 20 GHz frequency range and a very high data rate. In another implementation, reconfigurable receive/transmit antennas 316*a*, 316*d*, 316*c* and 316*d* may be may be configured to transmit signals in the 60 GHz frequency range, sometimes referred to as “60 GHz communications,” which involve transmission and reception of millimeter wave signals. Among the applications for 60 GHz communications are wireless personal area networks, wireless high-definition television signal and Point-to-Point links.

As illustrated in FIG. 3B, while the wireless transceiver is in the transmission mode, reconfigurable receive/transmit antennas 316*a*, 316*d*, 316*c* and 316*d* may be vertical-polarization transmit antennas configured to transmit vertically-polarized signals based on vertically-polarized signals 320*a*, 320*b*, 320*c* and 320*d*, respectively. In the transmission mode, vertically-polarized input 336*a*, for example, from master chip 380 in FIG. 3A, is provided to a transmit circuit having phase shifter 324*b* and power amplifier (PA) 332*a*, where phase shifter 324*b* is configured to generate an output to PA 332*a*, and PA 332*a* is configured to generate vertically-polarized signal 320*a* to reconfigurable receive/transmit antenna 316*a* for transmission. Vertically-polarized input 336*b*, for example, from master chip 380 in FIG. 3A, is provided to a transmit circuit having phase shifter 324*d* and power amplifier (PA) 332*b*, where phase shifter 324*d* is configured to generate an output to PA 332*b*, and PA 332*b* is configured to generate vertically-polarized signal 320*b* to reconfigurable receive/transmit antenna 316*b* for transmission. Vertically-polarized input 336*c*, for example, from master chip 380 in FIG. 3A, is provided to a transmit circuit having phase shifter 324*f* and power amplifier (PA) 332*c*, where phase shifter 324*f* is configured to generate an output to PA 332*c*, and PA 332*c* is configured to generate vertically-polarized signal 320*c* to reconfigurable receive/transmit antenna 316*c* for transmission. Vertically-polarized input 336*d*, for example, from master chip 380 in FIG. 3A, is provided to a transmitting circuit having phase shifter 324*h* and power amplifier (PA) 332*d*, where phase shifter 324*h* is configured to generate an output to PA 332*d*, and PA 332*d* is configured to generate vertically-polarized signal 320*d* to reconfigurable receive/transmit antenna 316*d* for transmission.

As further illustrated in FIG. 3B, control bus 310*a* is provided to RF front end chip 307*a*, where control bus 310*a* is configured to provide phase shift information/signals to phase shifters 324*b*, 324*d*, 324*f* and 324*h* in RF front end chip 307*a* to cause a phase shift in at least one of vertically-polarized inputs 336*a*, 336*b*, 336*c* and 336*d*. Control bus 310*a* is also configured to provide amplitude control information/signals to PAs 332*a*, 332*b*, 332*c* and 332*d* in RF front end chip 307*a* to cause an amplitude change in at least one of vertically-polarized inputs 336*a*, 336*b*, 336*c* and 336*d*.

In another implementation, when the wireless transceiver is in the reception mode, reconfigurable receive/transmit antennas 316*a*, 316*b*, 316*c* and 316*d* are configured to be vertical-polarization antennas to provide vertically-polarized signals 318*a*, 318*b*, 318*c* and 318*d*, respectively, to RF front end chip 307*a*. In this implementation, when the wireless transceiver is in the transmission mode, reconfigurable receive/transmit antennas 316*a*, 316*b*, 316*c* and 316*d* are configured to be horizontal-polarization antennas, where RF front end chip 307*a* is configured to provide horizontally-polarized signals 320*a*, 320*b*, 320*c* and 320*d* to reconfigurable receive/transmit antennas 316*a*, 316*b*, 316*c* and 316*d*, respectively, for transmission.

As illustrated in FIG. 3B, in another implementation, when the wireless transceiver is in the reception mode, reconfigurable receive/transmit antennas 316*a* 316*b*, 316*c* and 316*d* are left-hand circular-polarization receive antennas, that are configured to provide left-hand circularly-polarized signals 318*a*, 318*b*, 318*c* and 318*d*, respectively, to RF front end chip 307*a*. In this implementation, when the wireless transceiver is in the transmission mode, reconfigurable receive/transmit antennas 316*a* 316*b*, 316*c* and 316*d* are right-hand circular-polarization transmit antennas, where RF front end chip 307*a* is configured to provide right-hand circularly-polarized signals 320*a*, 320*b*, 320*c* and 320*d* to reconfigurable receive/transmit antennas 316*a* 316*b*, 316*c* and 316*d*, respectively, for transmission.

In another implementation, when the wireless transceiver is in the reception mode, reconfigurable receive/transmit antennas 316*a* 316*b*, 316*c* and 316*d* are right-hand circular-polarization receive antennas, that are configured to provide right-hand circularly-polarized signals 318*a*, 318*b*, 318*c* and 318*d*, respectively, to RF front end chip 307*a*. In this implementation, when the wireless transceiver is in the transmission mode, reconfigurable receive/transmit antennas 316*a* 316*b*, 316*c* and 316*d* are left-hand circular-polarization transmit antennas, where RF front end chip 307*a* is configured to provide left-hand circularly-polarized signals 320*a*, 320*b*, 320*c* and 320*d* to reconfigurable receive/transmit antennas 316*a* 316*b*, 316*c* and 316*d*, respectively, for transmission.

Referring now to FIG. 3C, FIG. 3C illustrates a top plan view of a portion of a phased array antenna panel of an exemplary wireless transceiver according to one implementation of the present application. As illustrated in FIG. 3C, phased array antenna panel 302 includes reconfigurable receive/transmit antennas 316*a*, 316*b*, 316*y* and 316*z* (collectively referred to as reconfigurable receive/transmit antennas 316*a* through 316*z*). In the present implementation, substantially every or in fact every antenna in phased array antenna panel 302 is reconfigurable, such that the wireless transceiver is configured to dynamically assign each of the reconfigurable receive/transmit antennas to operate in either the reception mode or the transmission mode.

For example, the wireless transceiver may dynamically assign a portion or all of reconfigurable receive/transmit antennas 316*a* through 316*z* to form a receive configuration to operate in the reception mode in one period of time, while assign a portion or all of reconfigurable receive/transmit antennas 316*a* through 316*z* to form a transmit configuration to operate in the transmission mode in another period of time. In another implementation, the wireless transceiver may dynamically assign reconfigurable receive/transmit antennas 316*a* through 316*z* to form one or more transmit configurations and one or more receive configurations.

In one implementation, reconfigurable receive/transmit antennas 316*a* through 316*z* in phased array antenna panel 302 may be configured to communicate with one or more wireless transceivers, such as commercial geostationary communication satellites or low earth orbit satellites having a very large bandwidth in the 10 GHz to 20 GHz frequency range and a very high data rate. As illustrated in FIG. 3C, reconfigurable receive/transmit antennas 316*a* through 316*z* may each have a substantially square shape of substantially equal size. In one implementation, each of reconfigurable receive/transmit antennas 316*a* through 316*z* in phased array antenna panel 302 needs an area of at least a quarter wavelength (e.g., $\lambda/4 \approx 7.5$ mm) by a quarter wavelength (e.g., $\lambda/4 \approx 7.5$ mm) to receive signals at 10 GHz. These dimensions can also be used to transmit signals at 12 GHz. In one implementation, each of reconfigurable receive/transmit antennas 316*a* through 316*z* in phased array antenna panel 302 needs an area of at least a quarter wavelength (e.g., $\lambda/4 \approx 6.25$ mm) by a quarter wavelength (e.g., $\lambda/4 \approx 6.25$ mm) to transmit signals at 12 GHz. These dimensions can also be used to receive signals at 10 GHz. In another implementation, each of reconfigurable receive/transmit antennas 316*a* through 316*z* in phased array antenna panel 302 may be configured to transmit or receive signals in the 60 GHz frequency range using much smaller antenna sizes.

In the present implementation, phased array antenna panel 302 is a flat panel array employing reconfigurable receive/transmit antennas 316*a* through 316*z*, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 307*a* and 307*x* in FIG. 3A) associated with reconfigurable receive/transmit antennas 316*a* through 316*z*. In one implementation, the transmission beam is formed fully electronically by means of phase and amplitude control circuits, for example, in RF front end circuits (such as RF front end chips 307*a* and 307*x* in FIG. 3A) associated with reconfigurable receive/transmit antennas 316*a* through 316*z*. Thus, phased array antenna panel 302 can provide for beamforming for both reception and transmission without the use of any mechanical parts.

FIG. 4 illustrates an exemplary wireless communications system utilizing exemplary wireless transceivers according to one implementation of the present application. As illustrated in FIG. 4, satellite 460 is configured to communicate (e.g., transmit and receive data and/or signals) with various wireless transceivers, such as wireless transceiver 401*a* mounted on car 403*a*, wireless transceiver 401*b* mounted on recreational vehicle 403*b*, wireless transceiver 401*c* mounted on airplane 403*c* and wireless transceiver 401*d* mounted on house 403*d*. It should be understood that car 403*a*, recreational vehicle 403*b* and airplane 403*c* may each be moving, thereby causing a change in position of corresponding wireless transceivers 401*a* through 401*c*. It should be understood that, although house 403*d* can be stationary, the relative position of wireless transceiver 401*d* to satellite 460 may also change, for example, due to wind or other factors. In the present implementation, wireless transceivers 401*a* through 401*d* may each correspond to wireless transceiver 101 in FIG. 1A, where each of wireless transceivers 401*a* through 401*d* may include a phased array antenna panel, such as any of phased array antenna panels 202 in FIGS. 2A through 2D, or phased array antenna panel 302 in FIG. 3C, for transmitting and receiving wireless signals to satellite 460 or among themselves.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A device, comprising:

a phased array antenna panel comprising reconfigurable receive transmit antennas and a master chip, wherein
a first antenna of said reconfigurable receive transmit antennas is configured to:
receive a first signal of a first polarization for a first period of time; and
transmit a second signal of a second polarization for a second period of time,
said second polarization is different from said first polarization,
said second period of time is different from said first period of time,
a second antenna of said reconfigurable receive transmit antennas is configured to transmit a third signal of said second polarization,
said second antenna is approximately centered between four reconfigurable receive transmit antennas of said reconfigurable receive transmit antennas,
said four reconfigurable receive transmit antennas include said first antenna,
each of said four reconfigurable receive transmit antennas is configured to receive said first signal of said first polarization,
said reconfigurable receive transmit antennas are configured to form a receive beam based on first receive phase information and receive amplitude information provided by said master chip, and
said reconfigurable receive transmit antennas are configured to form a transmit beam based on first transmit phase information and transmit amplitude information provided by said master chip.

2. The device of claim 1, wherein said first antenna is configured to be a horizontal-polarization antenna for said reception of said first signal for said first period of time, and wherein said first signal is a horizontally-polarized signal.

3. The device of claim 1, wherein said second antenna is configured to be a vertical-polarization antenna for said transmission of said third signal, and wherein said third signal is a vertically-polarized signal.

4. The device of claim 1, further comprising an RF front end chip connected to said master chip, wherein said RF front end chip is configured to provide said first receive phase information and said receive amplitude information to said reconfigurable receive transmit antennas.

5. The device of claim 4, wherein said first transmit phase information and said transmit amplitude information for said reconfigurable receive transmit antennas is provided by said RF front end chip that is connected to said master chip.

6. The device of claim 1, wherein said first signal is received from a mobile transceiver on a vehicle and said second signal is transmitted to a satellite.

7. The device of claim 1, wherein said reconfigurable receive transmit antennas includes a third antenna configured to receive said first signal of said first polarization, and said second antenna is approximately half-way between said first antenna and said third antenna.

8. The device of claim 1, further comprising an RF front end chip connected to said master chip, said first antenna, and said second antenna, wherein said master chip is configured to provide said first receive phase information and said receive amplitude information to said RF front end chip, and said first antenna forms said receive beam in said first period of time based on said first receive phase information and said receive amplitude information.

9. The device of claim 1, further comprising a plurality of RF front end chips connected to said master chip, wherein each RF front end chip of said plurality of RF front end chips is connected to a set of reconfigurable receive transmit antennas of said reconfigurable receive transmit antennas, and each reconfigurable receive transmit antenna of said set of reconfigurable receive transmit antennas is configured to:

receive said first signal of only vertical polarization for said first period of time; and transmit said second signal of only horizontal polarization for said second period of time.

10. A device, comprising:

a phased array antenna panel comprising reconfigurable receive transmit antennas and a master chip, wherein a first antenna of said reconfigurable receive transmit antennas is configured to:

receive a first signal of a first polarization for a first period of time; and transmit a second signal of a second polarization for a second period of time, wherein said second period of time is different from said first period of time, a second antenna of said reconfigurable receive transmit antennas is configured to transmit a third signal of said second polarization, said second antenna is approximately centered between four reconfigurable receive transmit antennas of said reconfiqurable receive transmit antennas, said four reconfiqurable receive transmit antennas include said first antenna, each of said four reconfigurable receive transmit antennas is configured to receive said first signal of said first polarization, said first polarization is orthogonal to said second polarization, said first signal of said first polarization is different from said second signal of said second polarization, said reconfigurable receive transmit antennas are configured to concurrently transmit said third signal and receive said first signal, said reconfigurable receive transmit antennas are configured to form a receive beam based on first receive phase information and receive amplitude information provided by said master chip, and said reconfigurable receive transmit antennas are configured to form a transmit beam based on first transmit phase information and transmit amplitude information provided by said master chip.

11. The device of claim 10, wherein said first antenna is configured to be a horizontal-polarization antenna for said reception of said first signal for said first period of time, and wherein said first signal is a horizontally-polarized signal.

12. The device of claim 10, wherein said second antenna is configured to be a vertical-polarization antenna for said transmission of said third signal, and wherein said third signal is a vertically-polarized signal.

13. The device of claim 10, further comprising an RF front end chip connected to said master chip, wherein said RF front end chip is configured to provide said first receive phase information and said receive amplitude information to said reconfigurable receive transmit antennas.

14. The device of claim 13, wherein said first transmit phase information and said transmit amplitude information for said reconfigurable receive transmit antennas is provided by said RF front end chip that is connected to said master chip.

15. The device of claim 10, wherein said first signal is received from a mobile transceiver on a vehicle and said second signal is transmitted to a satellite.

16. The device of claim 10, wherein said reconfigurable receive transmit antennas includes a third antenna configured to receive said first signal of said first polarization, and said second antenna is approximately half-way between said first antenna and said third antenna.

17. A device, comprising:

a phased array antenna panel comprising reconfigurable receive transmit antennas and a master chip, wherein a first antenna of said reconfigurable receive transmit antennas is configured to:

receive a first signal of a first polarization for a first period of time; and transmit a second signal of a second polarization for a second period of time, said second polarization is different from said first polarization, said second period of time is different from said first period of time, a second antenna of said reconfigurable receive transmit antennas is configured to transmit a third signal of said second polarization, said second antenna forms one of a rectangular cluster or a non-rectangular cluster surrounded by a set of reconfigurable receive transmit antennas of said reconfigurable receive transmit antennas, said set of reconfigurable receive transmit antennas includes said first antenna, said set of reconfigurable receive transmit antennas is configured to receive said first signal of said first polarization, said reconfigurable receive transmit antennas are configured to form a receive beam based on first receive phase information and receive amplitude information provided by said master chip, and said reconfigurable receive transmit antennas are configured to form a transmit beam based on first transmit phase information and transmit amplitude information provided by said master chip.

18. A device, comprising:

a phased array antenna panel comprising reconfigurable receive transmit antennas and a master chip, wherein a first antenna of said reconfigurable receive transmit antennas is configured to:

receive a first signal of a first polarization for a first period of time; and transmit a second signal of a second polarization for a second period of time, wherein said second period of time is different from said first period of time, a second antenna of said reconfigurable receive transmit antennas is configured to transmit a third signal of said second polarization, said second antenna forms one of a rectangular cluster or a non-rectangular cluster surrounded by a set of reconfigurable receive transmit antennas of said reconfigurable receive transmit antennas, said set of reconfigurable receive transmit antennas includes said first antenna, said set of reconfigurable receive transmit antennas is configured to receive said first signal of said first polarization, said first polarization is orthogonal to said second polarization, said first signal of said first polarization is different from said second signal of said second polarization, said reconfigurable receive transmit antennas are configured to concurrently transmit said third signal and receive said first signal, said reconfigurable receive transmit antennas are configured to form a receive beam based on first receive phase information and receive amplitude information provided by said master chip, and said reconfigurable receive transmit antennas are configured to form a transmit beam based on first transmit phase information and transmit amplitude information provided by said master chip.

* * * * *